(12) United States Patent
Roy

(10) Patent No.: US 11,567,503 B1
(45) Date of Patent: Jan. 31, 2023

(54) COLD WEATHER BATTERY CAPACITY PREDICTION FOR ELECTRIC VEHICLE

(71) Applicant: Matthew MacGregor Roy, Ottawa (CA)

(72) Inventor: Matthew MacGregor Roy, Ottawa (CA)

(*) Notice: Subject to any disclaimer, the term of this patent is extended or adjusted under 35 U.S.C. 154(b) by 94 days.

(21) Appl. No.: 17/086,432

(22) Filed: Nov. 1, 2020

Related U.S. Application Data

(60) Provisional application No. 62/949,394, filed on Dec. 17, 2019.

(51) Int. Cl.
| | | |
|---|---|---|
| *G05D 1/02* | (2020.01) | |
| *B60L 50/60* | (2019.01) | |
| *G01C 21/36* | (2006.01) | |
| *B60L 58/10* | (2019.01) | |
| *G01C 21/34* | (2006.01) | |
| *H04B 1/38* | (2015.01) | |
| *B60L 53/36* | (2019.01) | |

(52) U.S. Cl.
CPC ............ *G05D 1/0217* (2013.01); *B60L 50/60* (2019.02); *B60L 58/10* (2019.02); *G01C 21/3469* (2013.01); *G01C 21/3492* (2013.01); *G01C 21/362* (2013.01); *G05D 1/028* (2013.01); *H04B 1/38* (2013.01); *B60L 53/36* (2019.02)

(58) Field of Classification Search
CPC ...... G05D 1/0217; G05D 1/028; B60L 50/60; B60L 58/10; B60L 53/36; G01C 21/3469; G01C 21/3492; G01C 21/362; H04B 1/38
See application file for complete search history.

(56) References Cited

U.S. PATENT DOCUMENTS

| | | | | |
|---|---|---|---|---|
| 11,001,231 | B1* | 5/2021 | Hedman | B60R 16/0237 |
| 11,281,217 | B2* | 3/2022 | Herman | B60W 10/30 |
| 2014/0005847 | A1* | 1/2014 | Melen | G06F 1/28 700/291 |
| 2015/0348335 | A1* | 12/2015 | Ramanujam | G06Q 10/00 701/23 |
| 2017/0136894 | A1* | 5/2017 | Ricci | H02J 7/025 |
| 2017/0176195 | A1* | 6/2017 | Rajagopalan | G01C 21/3415 |
| 2018/0089631 | A1* | 3/2018 | Baker, Sr. | G06Q 10/087 |
| 2020/0003571 | A1* | 1/2020 | Shirakawa | G06Q 10/02 |
| 2020/0166356 | A1* | 5/2020 | Beaurepaire | B60L 58/12 |

* cited by examiner

*Primary Examiner* — Tuan C To
*Assistant Examiner* — Godfrey Aleksander Maciorowski

(57) ABSTRACT

An autonomous electric vehicle comprises a battery electrically connected to the electric motor for powering the electric motor and a battery status prediction module to predict, based on event data from a mobile device of a user of the vehicle, whether the vehicle will be parked at a destination and a time period when the vehicle will be parked. The battery status prediction module predicts a predicted battery status at the end of the time period based on a temperature profile for the time period obtained from a remote weather server. The battery status prediction module determines if the predicted battery status at the end of the time period will have at least a minimum battery capacity to travel a distance to a charging station determined by the battery status prediction module from the destination and a location of the charging station.

18 Claims, 46 Drawing Sheets

COLD WEATHER BATTERY CAPACITY PREDICTION FOR ELECTRIC VEHICLE

CROSS-REFERENCE TO RELATED APPLICATIONS

This application claims priority from U.S. Provisional Patent Application 62/949,394 entitled "Cold Weather battery Capacity Prediction for Electric Vehicle" filed Dec. 17, 2019.

TECHNICAL FIELD

The present invention relates generally to electric vehicles and, in particular, to battery management of electric vehicles in cold weather.

BACKGROUND

Electric vehicles have a chassis, wheels rotationally mounted to the chassis, and an electric motor (or multiple motors) to drive one or more of the wheels. A rechargeable battery (or a battery pack or a group of batteries) stores an electric charge to power the electric motor. The batteries used in electric vehicles are most commonly lithium-ion or lithium polymer batteries although other types of rechargeable batteries include lead-acid, nickel-cadmium, or nickel-metal hydride batteries.

In very cold weather, battery capacity is known to degrade significantly. Leaving an electric vehicle parked for a long period of time in cold weather may deplete the battery capacity to the point that the vehicle has insufficient charge to reach a charging station. A technical solution to this problem would be highly desirable.

SUMMARY

In general, the present invention provides a vehicle having an electric motor and a battery for powering the electric motor and a battery status prediction module to determine a predicted battery status using a time period when the vehicle will be parked and a temperature profile obtained from a weather server. The battery status prediction module may output an alert if the predicted battery status at the end of the time period has insufficient battery capacity to travel to a charging station.

One inventive aspect of the disclosure is an autonomous electric vehicle comprising a chassis, wheels rotationally mounted to the chassis, an electric motor mechanically connected to one or more of the wheels for driving the one or more of the wheels, and a battery electrically connected to the electric motor for powering the electric motor. The vehicle includes a navigation system for autonomously navigating the autonomous electric vehicle to a destination and a mobile device data interface connected to a mobile device of a user using the autonomous electric vehicle. The mobile device data interface receives event data from the mobile device relating to the destination. The event data is extracted from one of a calendar event, an electronic reservation or an electronic ticket. The vehicle further includes a battery status prediction module executed by a processor to predict, based on the event data received from the mobile device, whether the vehicle will be parked at the destination. If the battery status prediction module predicts that the vehicle will be parked at the destination, the battery status prediction module predicts, based on the event data received from the mobile device, a time period when the vehicle will be parked at the destination. The battery status prediction module predicts a predicted battery status at the end of the time period based on a temperature profile for the time period. The vehicle includes a radiofrequency transceiver communicatively connected to the battery monitoring system to obtain the temperature profile from a remote weather server for the time period when the vehicle will be parked. The battery status prediction module determines if the predicted battery status at the end of the time period will have at least a minimum battery capacity to travel a distance to a charging station determined by the battery status prediction module from the destination and a location of the charging station. The battery status prediction module, if the predicted battery status is below the minimum battery capacity, outputs an alert to the user that the predicted battery capacity at the end of the time period is insufficient to travel the distance to the charging station.

Another inventive aspect of the disclosure is an electric vehicle comprising a chassis, wheels rotationally mounted to the chassis, an electric motor mechanically connected to one or more of the wheels for driving the one or more of the wheels, and a battery electrically connected to the electric motor for powering the electric motor. The vehicle includes a parked-status prediction module for predicting from historical usage patterns a destination where the vehicle will be parked. The vehicle includes a mobile device data interface connected to a mobile device of a user using the electric vehicle. The mobile device data interface receives event data from the mobile device relating to the destination. The event data is extracted from one of a calendar event, an electronic reservation or an electronic ticket. The vehicle further includes a battery status prediction module executed by a processor to predict, based on the event data received from the mobile device, whether the vehicle will be parked at the destination. If the battery status prediction module predicts that the vehicle will be parked at the destination, the battery status prediction module predicts, based on the event data received from the mobile device, a time period when the vehicle will be parked at the destination. The battery status prediction module predicts a predicted battery status at the end of the time period based on a temperature profile for the time period. The vehicle includes a radiofrequency transceiver communicatively connected to the battery monitoring system to obtain the temperature profile from a remote weather server for the time period when the vehicle will be parked. The battery status prediction module determines if the predicted battery status at the end of the time period will have at least a minimum battery capacity to travel a distance to a charging station determined by the battery status prediction module from the destination and a location of the charging station. The battery status prediction module, if the predicted battery status is below the minimum battery capacity, outputs an alert to the user that the predicted battery capacity at the end of the time period is insufficient to travel the distance to the charging station.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
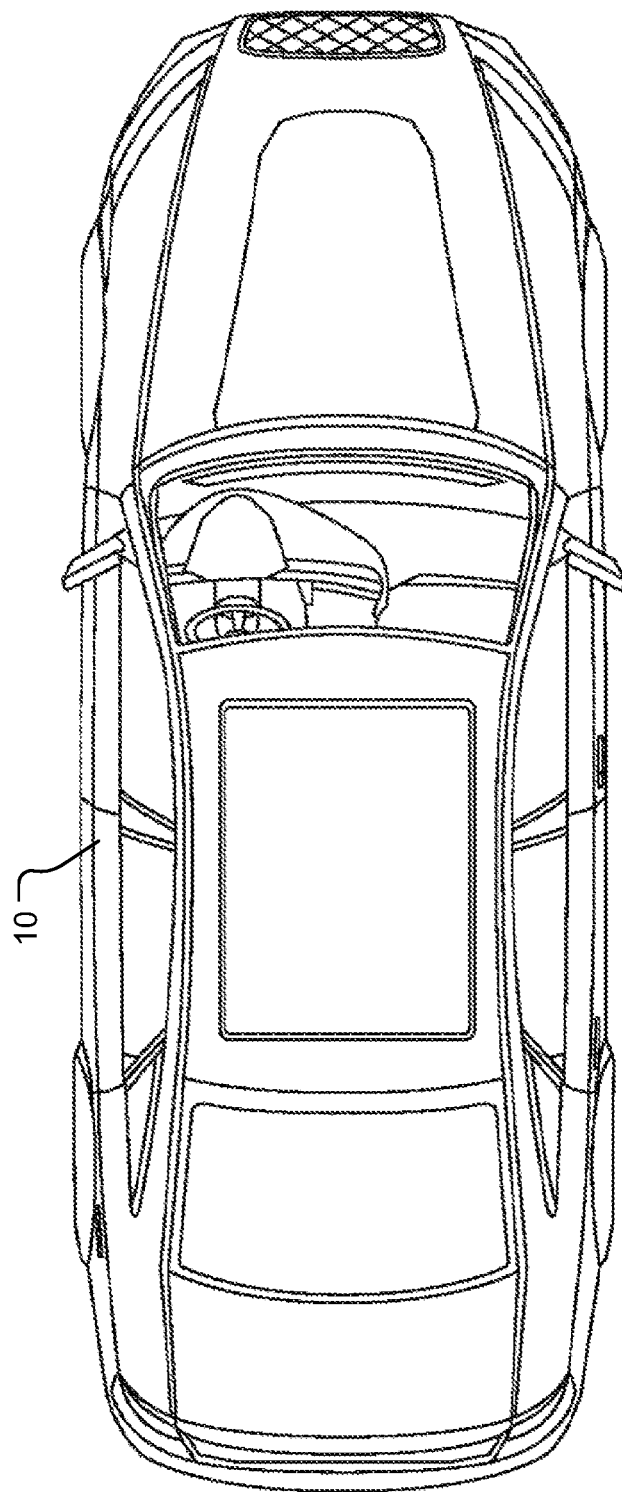
FIG. 1 is a top view of an autonomous electric vehicle in accordance with an embodiment of the present invention.
Figure 2:
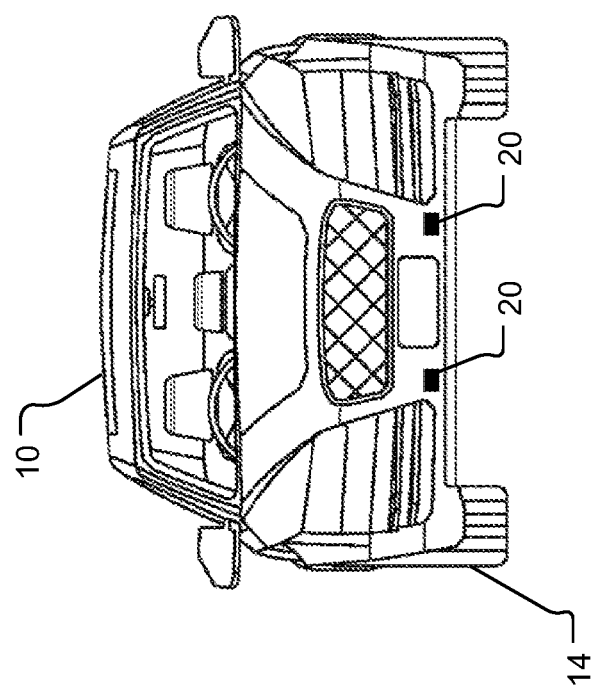
FIG. 2 is a front view of the autonomous electric vehicle of FIG. 1.
Figure 3:
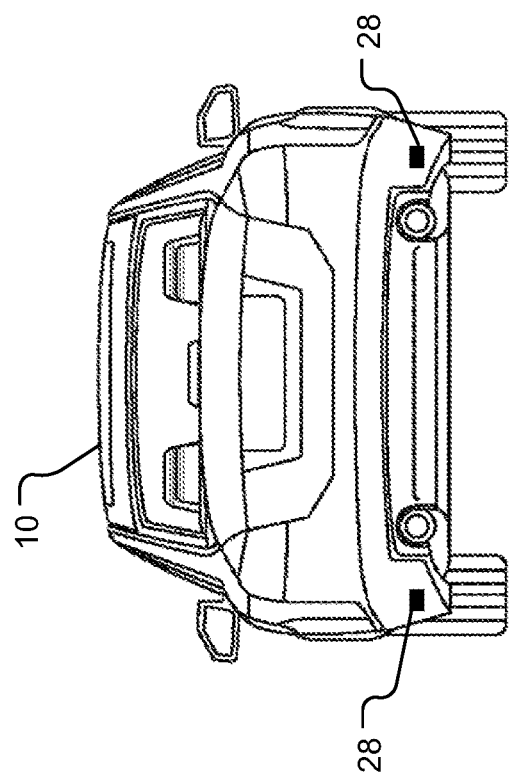
FIG. 3 is a rear view of the autonomous electric vehicle of FIG. 1.
Figure 4:
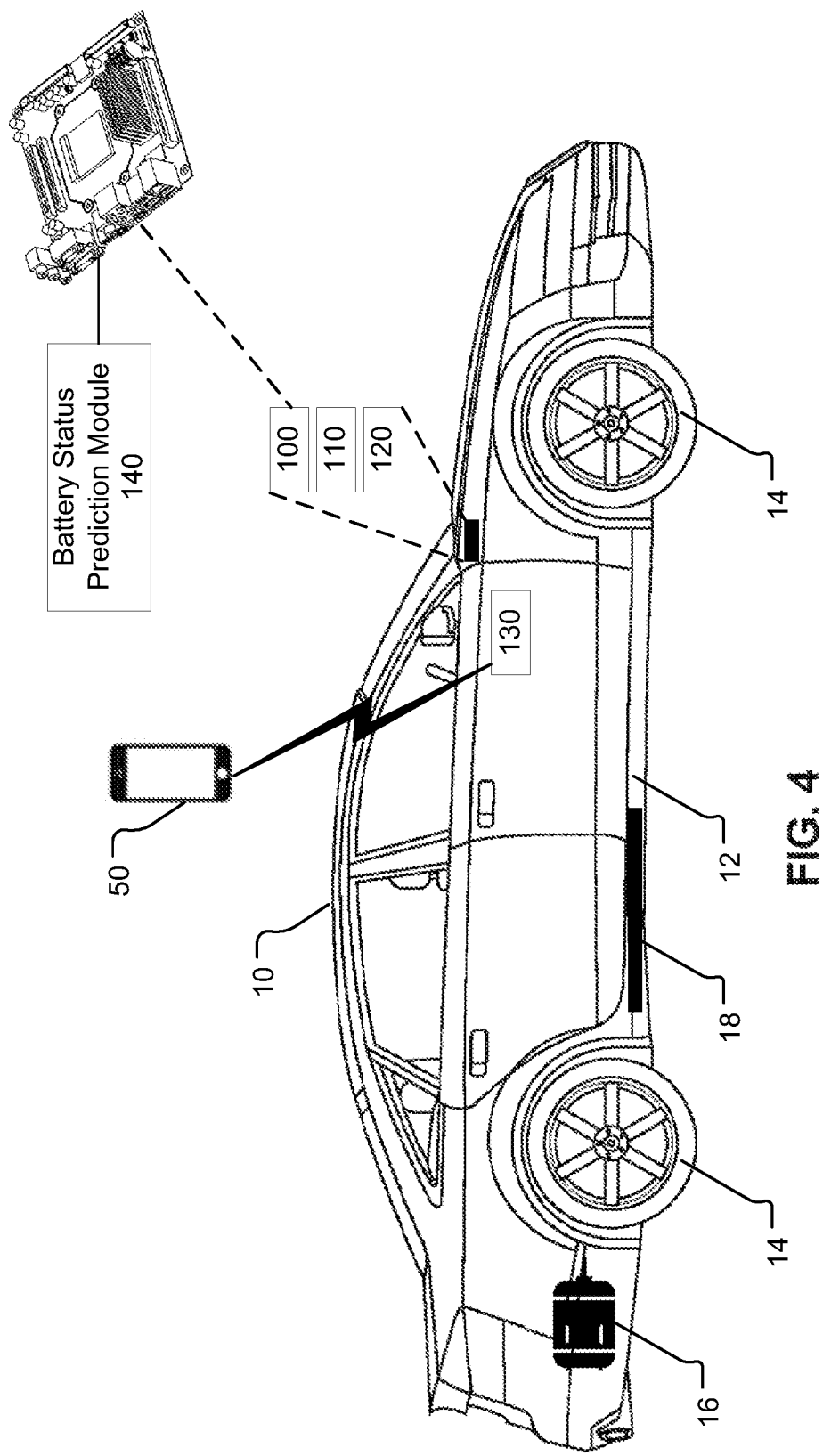
FIG. 4 is a right side view of the autonomous electric vehicle of FIG. 1.
Figure 5:
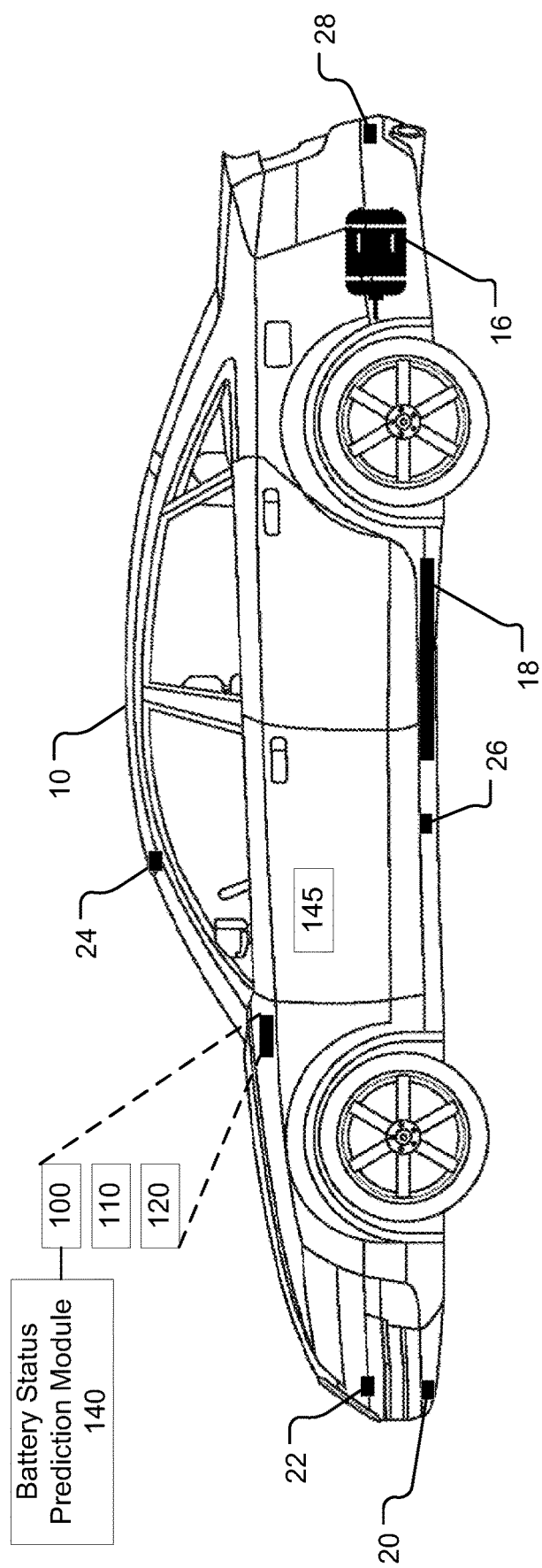
FIG. 5 is a left side view of the autonomous electric vehicle of FIG. 1.

Disclosed herein are various embodiments of an electric vehicle 10 capable of predicting a battery status after a time period of being exposed to cold weather. In some embodiments, the electric vehicle 10 may be an autonomous electric vehicle. In other embodiments, the electric vehicle 10 may be a human-driven electric vehicle. In yet other embodiments, the electric vehicle may be a mixed-mode vehicle that can operate autonomously or be human-driven.

For the purposes of this specification, the term "vehicle" is meant to encompass any wheeled vehicle such as a car, van, minivan, sports utility vehicle (SUV), crossover-type vehicle, bus, minibus, truck, tractor-trailer, semi-trailer, construction vehicle, work vehicle, offroad vehicle, electric cart, or the like. The terms "autonomous vehicle" and "self-driving vehicle" are meant to encompass any wheeled vehicle having environment-detecting sensors and a processor, controller, computer, computing device or computer system for autonomously steering, accelerating and braking the vehicle, i.e. self-driving or driving autonomously, without a driver physically touching, interacting with or providing direct or immediate input to the steering wheel, accelerator pedal and brake pedal.

For the purposes of this specification, a mixed-mode (human-drivable and self-drivable) vehicle is a self-driving car, truck, van, etc. that can be optionally driven directly by a human driver sitting in the driver's seat. The mixed-mode vehicle has two operating modes: (i) a conventional human driver mode with a human directly driving the vehicle using the steering wheel, brake pedal and accelerator as is conventionally done with non-autonomous vehicles; and (ii) a self-driving (or autonomous) mode in which the vehicle's processor or computing system drives autonomously without direct human input, whether a human is seated in the driver's seat or not.

FIGS. 1-5 depict an autonomous electric vehicle 10 as one exemplary implementation of a electric vehicle (EV). The self-driving vehicle or autonomous vehicle (AV) 10 includes, in the illustrated embodiment, a vehicle chassis 12 and a plurality of wheels 14, and an electric motor 16 supported by the chassis and mechanically connected to one or more wheels for providing traction to the one or more of the wheels. The vehicle 10 includes a braking system (or regenerative braking system) and a steering system for steering the vehicle via a steering mechanism. The vehicle 10 includes a rechargeable battery 18, hereinafter referred to simply as the battery. For the purposes of this specification, the battery is meant to include a plurality of rechargeable batteries or battery pack(s). The battery 18 stores an electric charge to power the electric motor 16 and other electrical equipment of the vehicle. The battery is electrically connected to a power management system drawing current, or managing the draw of current, from the battery.

The autonomous vehicle 10 depicted by way of example in FIGS. 1-5 includes a plurality of sensors i.e. environment-detecting sensors for collision avoidance and following a road. The sensors may include RADAR, LIDAR, cameras and ultrasonic rangefinders. The autonomous (or self-driving) vehicle 10 further includes a self-driving processor, processors or computing device(s) configured to receive analog or digital signals (data) from the sensors and to generate steering, acceleration and braking control signals for controlling the steering system, the motor and the braking system of the vehicle. The autonomous driving processor may generate a steering control signal, an acceleration control signal and a braking control signal based on the signals received from the sensors. The autonomous driving processor may also generate other control signals for other subsystems and equipment on the vehicle, e.g. a turn indicator light control signal, a horn control signal, a headlight control signal, a transmission selector signal, an ignition shutoff signal, an ignition start-up signal, a door lock signal, a door unlock signal, a windshield defroster signal, a windshield wiper activation signal, a wiper fluid squirt signal, climate control signal, headlight activation signal, to name but a few.

In the illustrated embodiment of FIGS. 1-5, the vehicle has a first sensor 20, a second sensor 22, a third sensor 24, a fourth sensor 26, and a fifth sensor 28. In the illustrated embodiment of FIGS. 1-5, the first, second, third, fourth and fifth sensors can be visible-spectrum cameras, infrared cameras and/or thermal imaging cameras. One or more of the sensors can be RADAR or LIDAR. Additional sensors may be provided on the vehicle 10, including additional cameras, additional LIDAR and RADAR sensors. The location of the sensors on the vehicle may be varied from what is shown in the figures. A different suite of sensors from what is illustrated may be used in other variants. These sensors are communicatively connected, either by wired or wireless channels, to the processor 100 for executing the autonomous driving functions based on the sensor input. The processor 100 may be coupled to a memory.

The autonomous (self-driving) vehicle 10 depicted by way of example in FIGS. 1-5 further includes a radiofrequency data transceiver 110, e.g. a cellular data transceiver, short-range wireless transceiver, a satellite transceiver or any other radiofrequency data transceiver. The data transceiver 110 may be any suitable wireless data transceiver for transmitting and receiving data wirelessly. In one main embodiment, the data transceiver is a cellular data transceiver (e.g. GSM, LTE, 5G or equivalent) that transmits data to a remote internet-connected server 250 via a base transceiver station 150 that provides a data gateway to the internet 200.

The autonomous vehicle 10 depicted by way of example in FIGS. 1-5 further includes a navigation system for autonomously navigating the autonomous electric vehicle to a destination. The navigation system includes a Global Navigation Satellite System (GNSS) receiver 120 for receiving satellite signals and for determining a current location of the autonomous vehicle. The GNSS receiver 120 may be a Global Positioning System (GPS) receiver that decodes satellite signals transmitted by orbiting GNSS satellites. The GNSS (or GPS) receiver may be part of the vehicle navigation system. The GNSS or GPS receiver (e.g. in the form of a chip or chipset) receives GNSS/GPS radio signals transmitted from one or more orbiting GNSS/GPS satellites. References herein to "GPS" are meant to include Assisted GPS and Aided GPS. Although the present disclosure refers expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multinational Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

The electric vehicle 10 further includes a mobile device data interface 130 connected to a mobile device 50 of a user using the autonomous electric vehicle 10. The interface may entail a wired connection (e.g. a USB connection) or a wireless connection (e.g. a Bluetooth® or Wi-Fi® connection). The mobile device data interface 130 receives event data from the mobile device 50 relating to the destination D.

Figure 6:
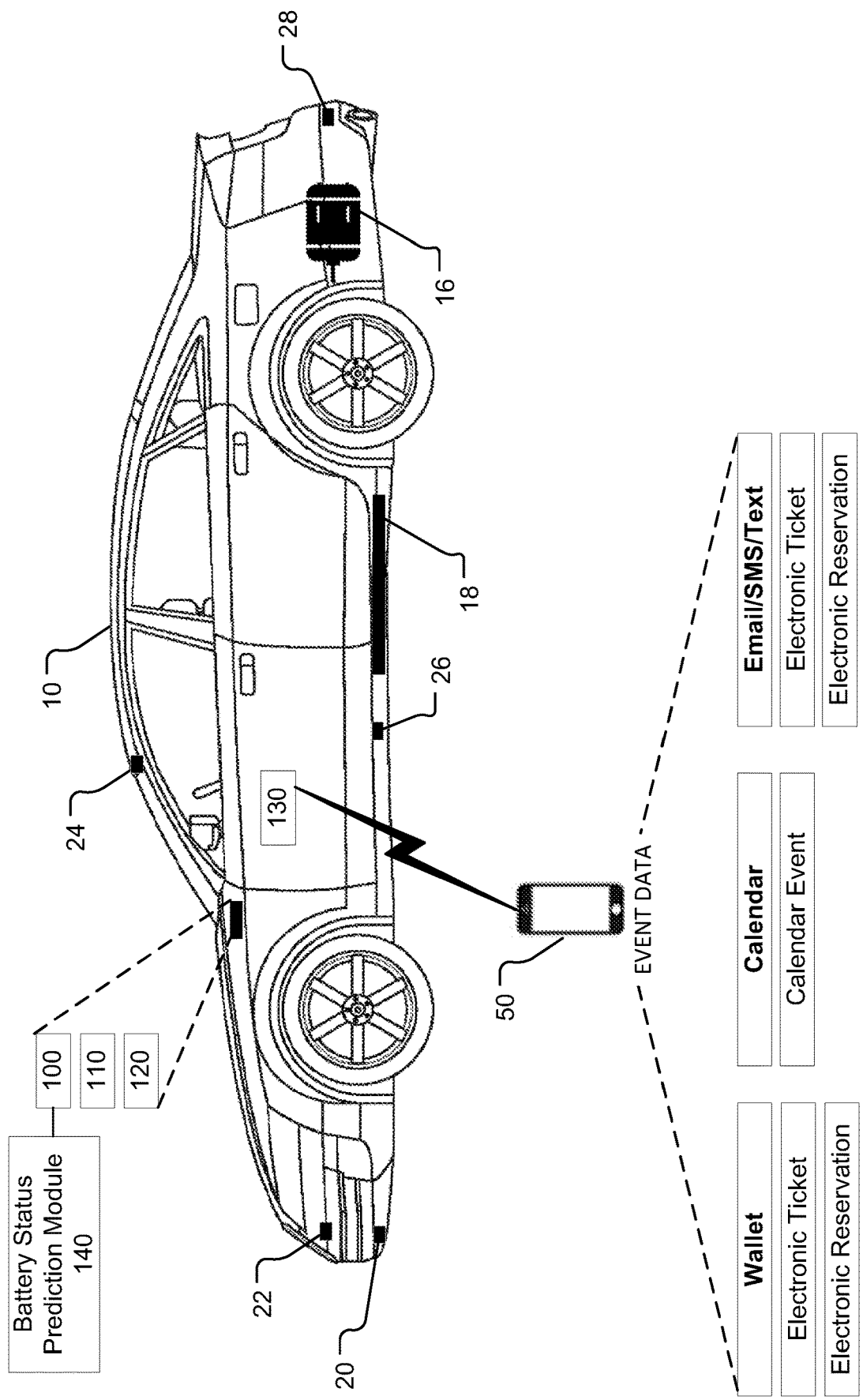
FIG. 6 depicts a vehicle obtaining event data from an electronic ticket, electronic reservation or calendar event stored on a mobile device.

In the embodiment shown by way of example in FIG. 6, the event data is extracted from one of a calendar event, an electronic reservation or an electronic ticket stored in a memory of the mobile device or alternatively stored in a vehicle memory or alternatively stored in another connected computing device. In a variant, the event data may be extracted from two or more of the calendar event, electronic reservation or electronic ticket stored in the memory of the mobile device. Extracting data may involve parsing data for keywords. In the embodiment depicted in FIG. 6, the calendar event may be in a calendar application or agenda in a memory of the mobile device or on a cloud-based server accessible by the mobile device. Even the absence of any calendar entries for a period of time may imply that the user will be on vacation. The electronic reservation or electronic ticket may be in an e-wallet, or in an e-mail (either in the body of the e-mail or as an attachment) or in an SMS or text message.

Figure 7:
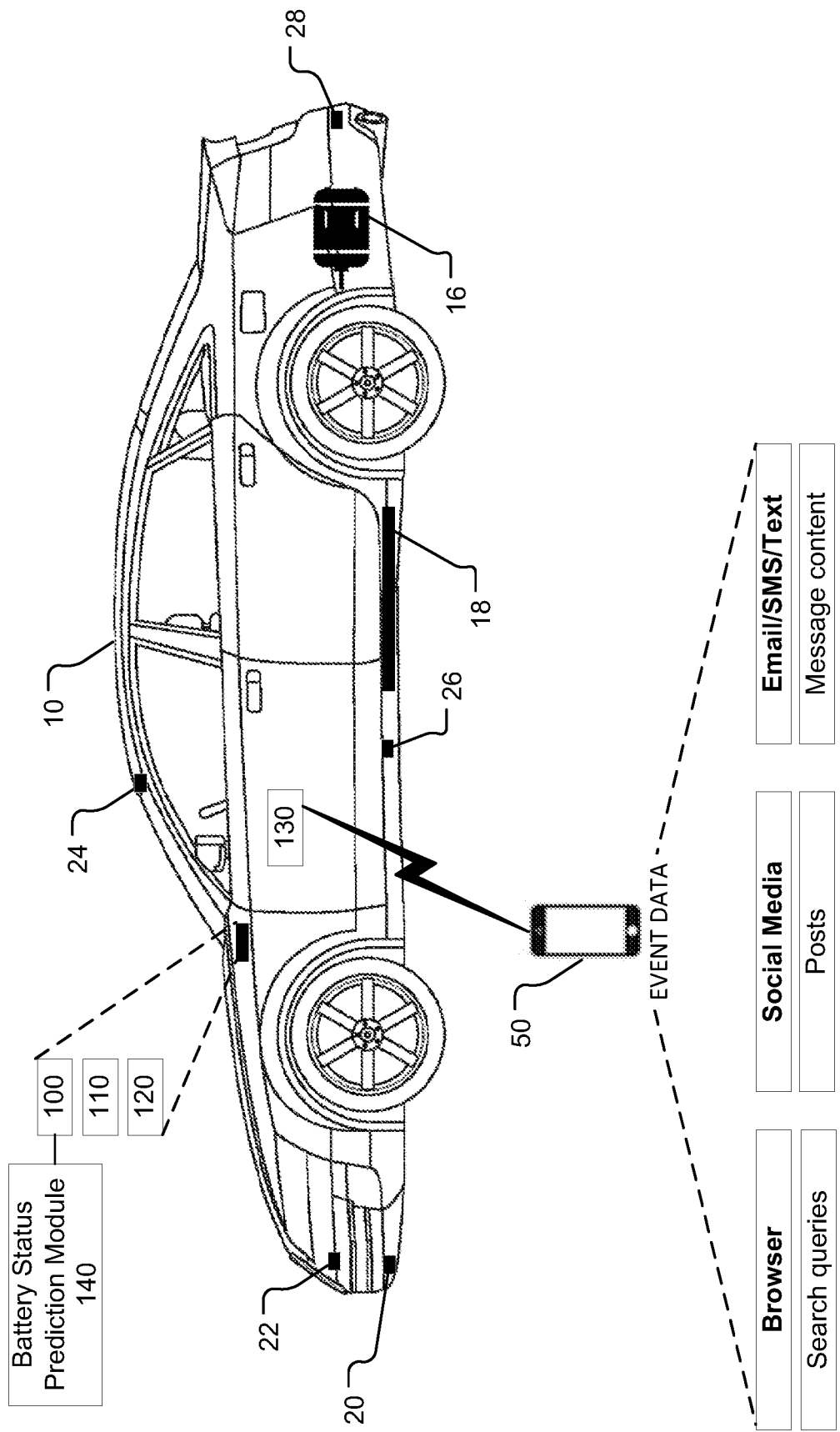
FIG. 7 depicts a vehicle obtaining event data from a browser, social media or message content in an e-mail, SMS or text message.

In the embodiment shown by way of example in FIG. 7, the event data is extracted from one or more of a browser, social media and/or e-mail/SMS/text messages. Event data may be obtained from the browser by parsing search queries, search results, downloaded webpages, etc. For example, the browser may be used to check availability dates for a hotel or a flight. The specified dates may be used to infer the time period when the vehicle will be parked. Social media posts may also be parsed to obtain event data. A post from the user of the mobile device may indicate that the user is going on a trip. A check-in may be used to infer the user's plans. The message content of an e-mail, SMS or text message may be parsed to extract information about the user's plans. For example, a message to the user wishing the user an enjoyable trip or holiday may be used to infer that the user will be parking the vehicle for an extended period of time. An out-of-office notification in an e-mail application may be used to infer how long the user will park the vehicle.

Figure 8:
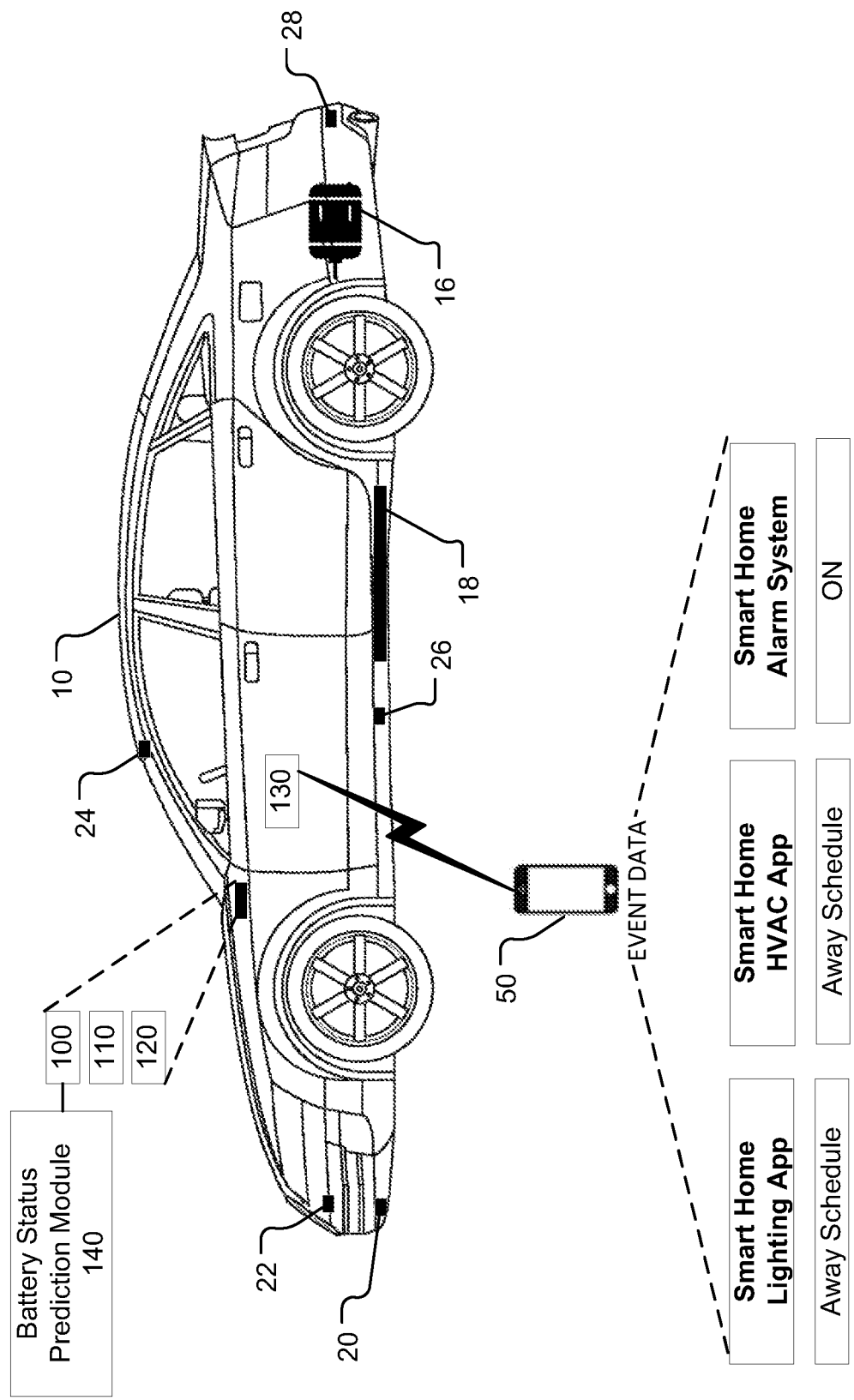
FIG. 8 depicts a vehicle obtaining event data from a smart home lighting app, a smart home HVAC app or a home alarm system app.

In another embodiment, as depicted in FIG. 8, the mobile device 50 may have a smart home application that is set by the user to control lights, blinds, an alarm system, web cameras, etc. If the smart home application is set in an away mode or a vacation mode, the mobile device 50 may use this information to infer that the user is heading on a vacation or trip and thus may predict the time when the vehicle will be parked.

In the embodiment shown in FIG. 8, the vehicle 10 obtains event data from a smart home lighting app, a smart home HVAC app or a home alarm system app on the mobile device 50 via the mobile device data interface 130. The smart home lighting app may provide data indicative of that the user is away from the home. The smart home lighting app or smart home HVAC app may include a calendar or a return date that enables the BPSM of the vehicle to determine how long the vehicle will be parked. The home alarm system app may also provide information indicating how long the user will be away and thus how long the vehicle will be parked.

As shown in FIGS. 4-8, the electric vehicle 10 includes a battery status prediction module 140 executed by a processor of the electric vehicle. The battery status prediction module 140 is configured (e.g. programmed) to predict, based on the event data received from the mobile device 50, whether the electric vehicle will be parked at the destination D. For example, a calendar entry (or appointment) in the calendar of the mobile device corresponding to the time of arrival of the electric vehicle at the destination enables the battery status prediction module 140 to infer that the electric vehicle will be parked for the duration of the calendar entry or appointment. As another example, an airline ticket in an e-wallet, e-mail or SMS with departure and return dates enables the battery status prediction module 140 to determine the length of time the vehicle will be parked. As a further example, a hotel reservation in an e-wallet, e-mail or SMS enables the battery status prediction module 140 to infer that the vehicle will be parked for the duration of the hotel stay. If the battery status prediction module 140 predicts that the vehicle 10 will be parked at the destination based on the event data, the battery status prediction module 140 then predicts, based on the event data received from the mobile device 50, a time period when the vehicle 10 will be parked at the destination D. As noted above, the time period may be determined from the duration of a calendar entry, or from other time indicators such as the check-out time or return date of electronic reservations or electronic tickets. The battery status prediction module 140 then predicts (i.e. computes or determines) a predicted battery status at the end of the time period based on a temperature profile for the time period. The battery status prediction module (BSPM) 140 obtains the temperature profile for the time period by cooperating with the radiofrequency transceiver 110 with which it is communicatively connected to download the temperature profile from a remote weather server 250 for the time period when the electric vehicle (EV) 10 will be parked.

Figure 9:
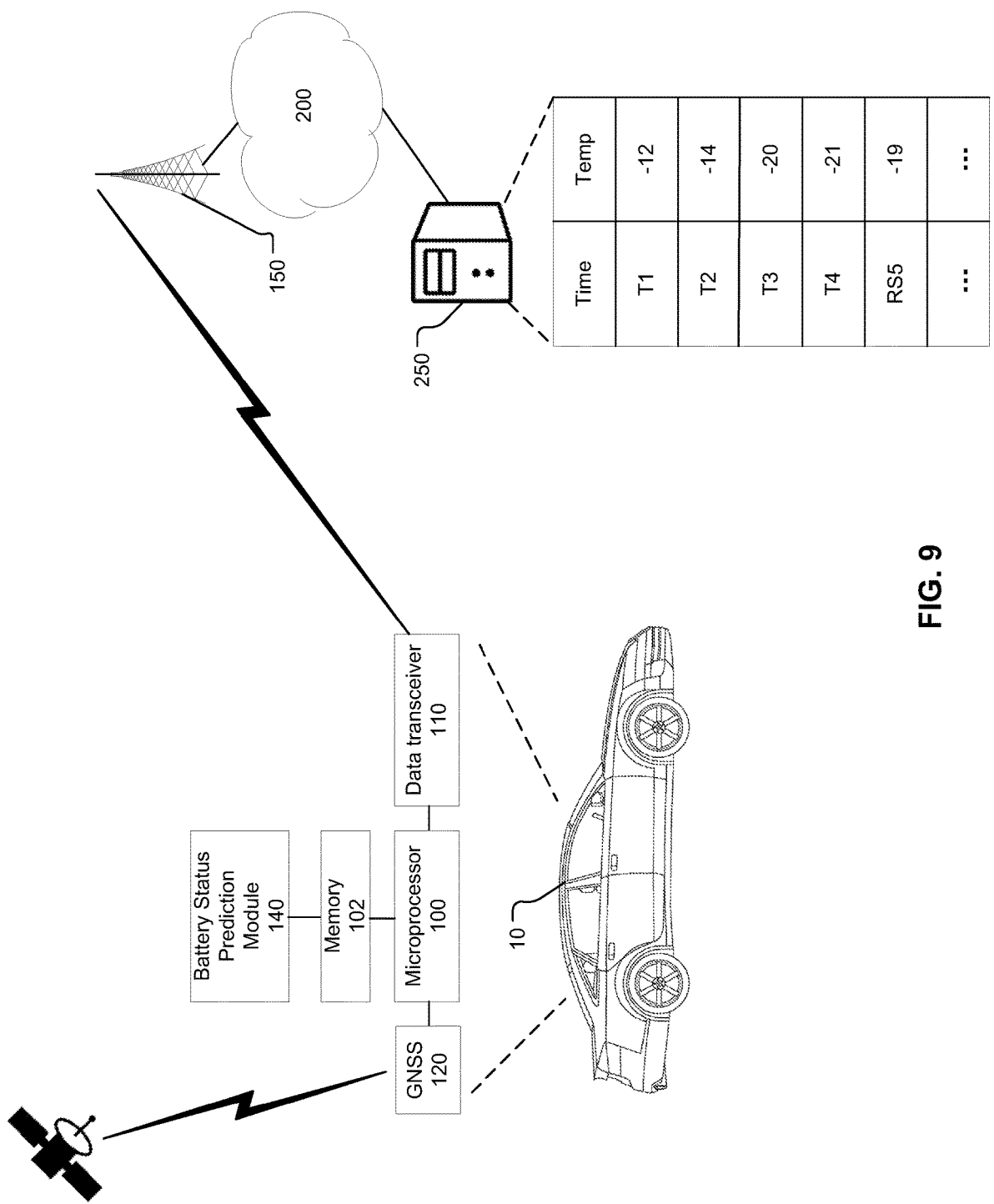
FIG. 9 is a schematic depiction of the vehicle obtaining a temperature profile from a network-connected weather server.

FIG. 9 depicts a system in which the electric vehicle 10 communicates with the remote network-connected weather server 250 to obtain weather data. In a variant, the mobile device 50 can download the weather data and then share the downloaded weather data with the BSPM 140. The weather data includes a temperature profile for the time period when the vehicle will be parked. The temperature profile includes a set of predicted temperatures for the time period when the vehicle will be parked. For example, the temperature profile may include the predicted temperature for each hour of the time period or for every 15 minutes or every 30 minutes. As another example, the temperature profile may include the high and the low of each day of the time period. The temperature profile may also optionally include the wind chill factor. The weather data may be downloaded in response to determining that the vehicle has been parked or it may be downloaded pre-emptively upon a determination or inference that the vehicle is arriving at a destination where the vehicle is probably going to be parked.

Once the temperature profile is obtained, the BSPM 140 computes the predicted battery status at the end of the time period using the temperature profile. The BSPM 140 may use one or more predetermined formulae, equations, look-up tables, graphs or other mathematical models to determine the predicted battery status given the temperature profile and time period. In one embodiment, the rate of depletion of battery capacity (mAh or kWh) is a function of temperature and time. The rate of decrease in battery voltage (V) may also be computed as part of the predicted battery status. The rate of decrease in battery voltage is also a function of temperature and time. The predicted battery status may be characterized by a battery capacity (in mAh or kWh) and/or voltage (in volts). The total number of discharge cycles for the battery may also be used to predict the battery status after the time period.

Figure 10:
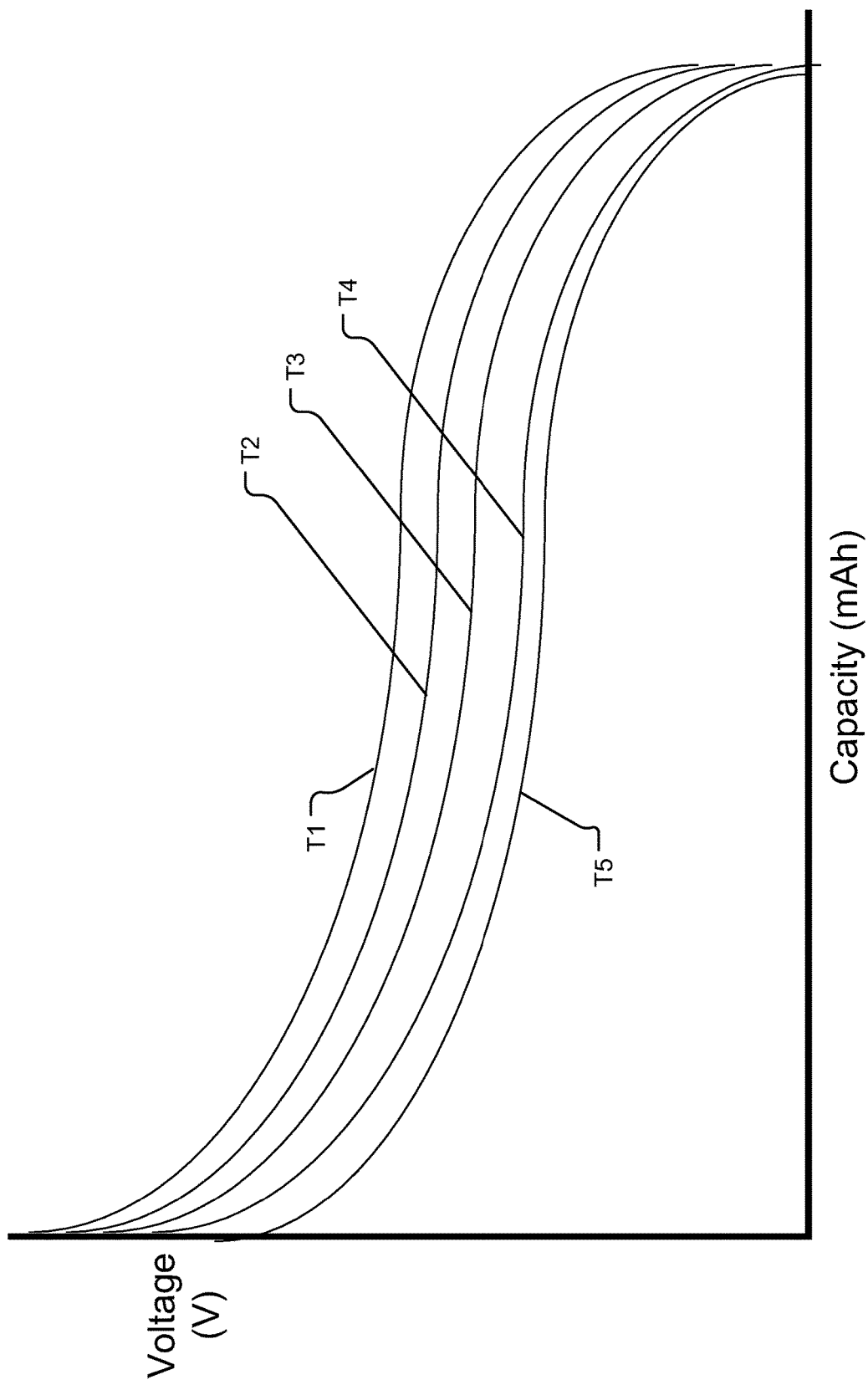
FIG. 10 is an example of a graph of voltage versus capacity for different temperatures that may be used to predict the battery status after exposure to a low temperature for a time period.

FIG. 10 is an example of a graph of voltage versus capacity for different temperatures (T1-T5) that may be used to predict the battery status after exposure to a low temperature for a time period. This graph is merely illustrative of the type of graph that may be stored in the memory of the vehicle or in a memory accessible by the BSPM 140 to predict the effect of temperature on the voltage and capacity of the battery.

Figure 11:
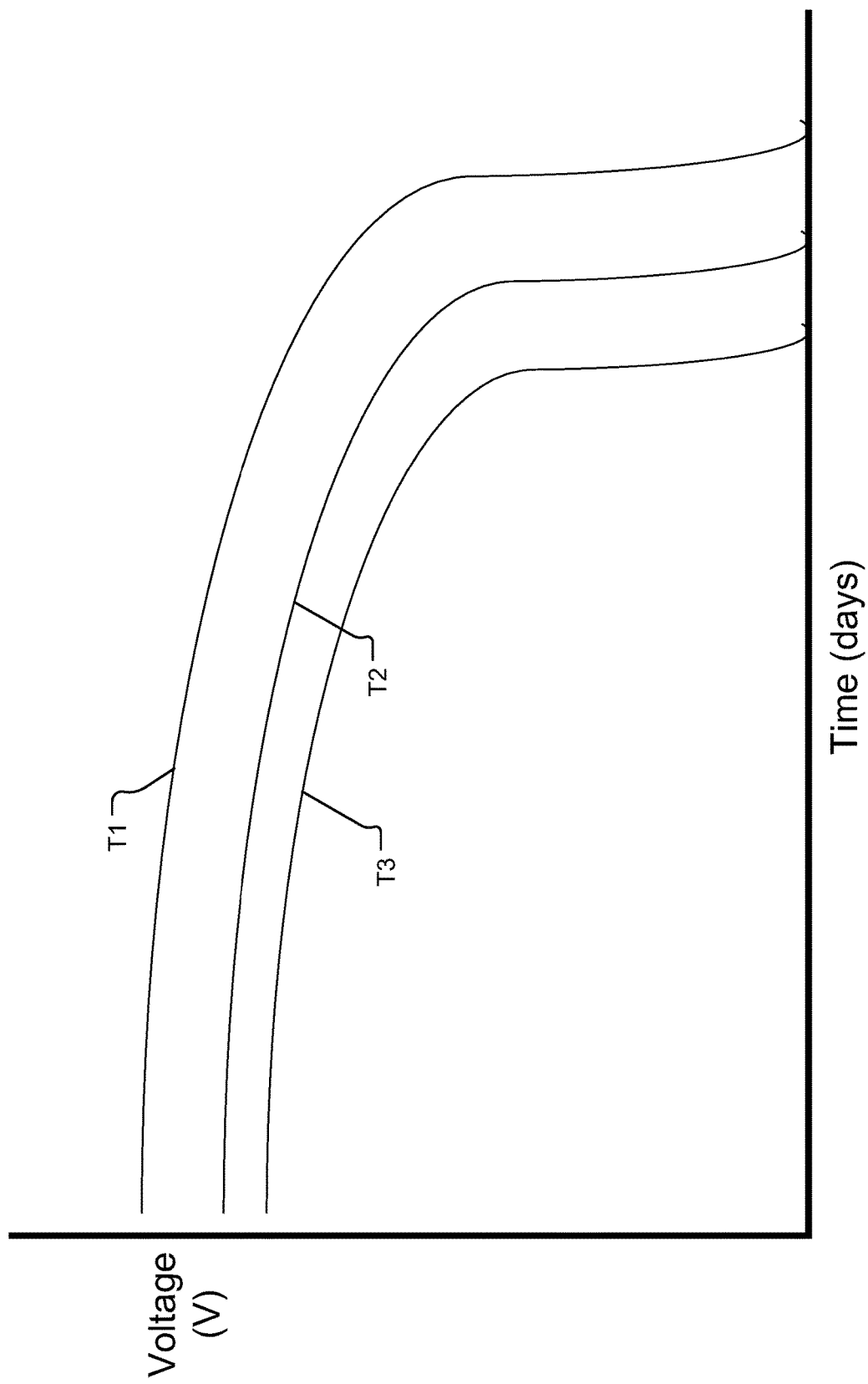
FIG. 11 is an example of a graph of voltage versus time for different temperatures that may be used to predict the battery status after exposure to a low temperature for a time period.

FIG. 11 is an example of a graph of voltage versus time for different temperatures (T1-T3) that may be used to predict the battery status after exposure to a low temperature for a time period. Again, this graph is merely illustrative of the type of graph that may be stored in the memory of the vehicle or in a memory accessible by the BSPM 140 to predict the effect of temperature on the voltage of the battery over time.

The battery status prediction module 140 determines if the predicted battery status at the end of the time period will have at least a minimum battery capacity to travel a distance to a charging station. The distance is determined by the battery status prediction module from the destination and a location of the charging station. In one example, the charging station may be the home of the user of the vehicle or the workplace of the user or a nearest charging station or a nearest reserved charging station.

Figure 12:
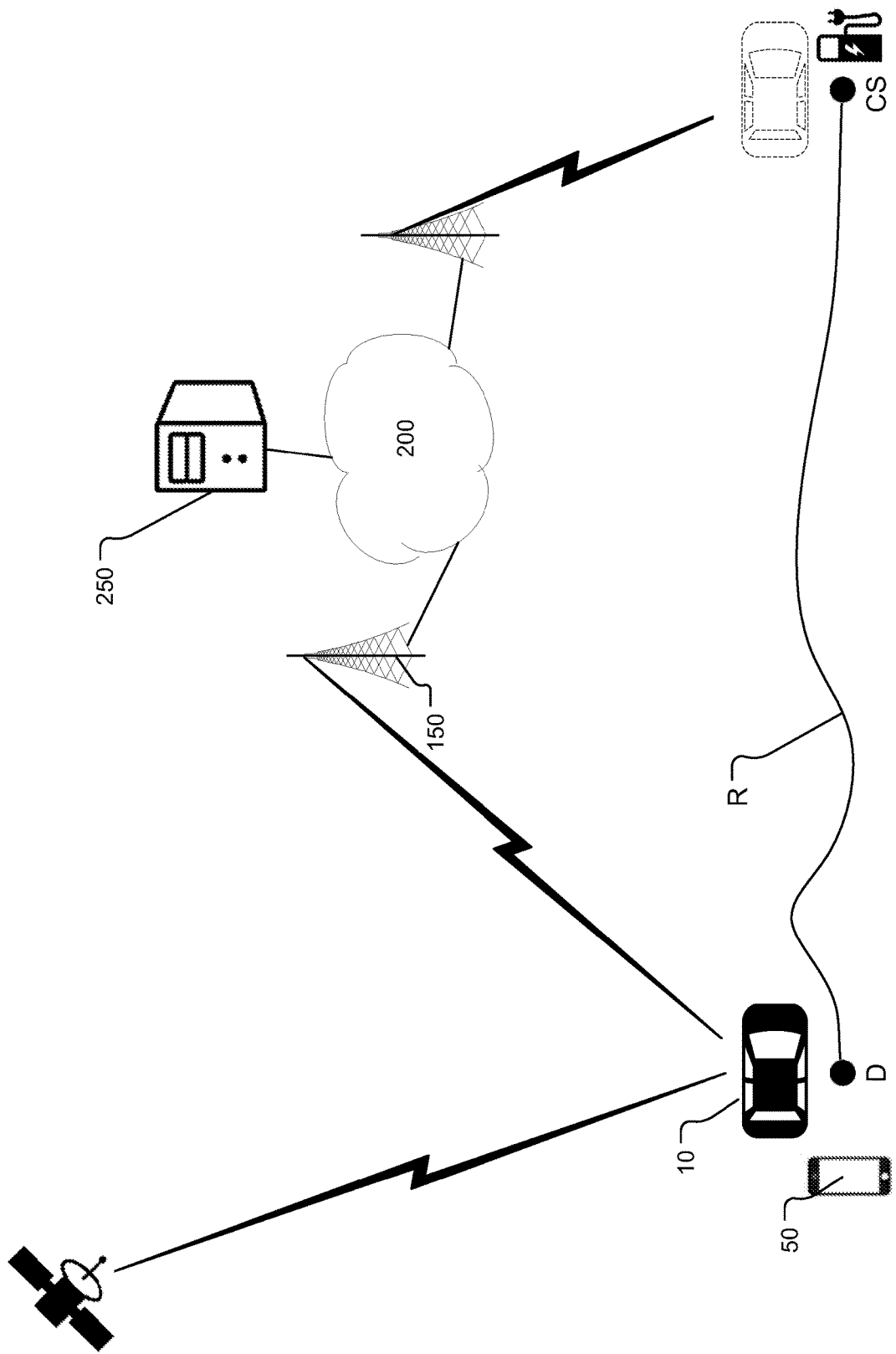
FIG. 12 is a schematic depiction of the vehicle determining a distance along a route to a charging station to assess whether there will be sufficient battery capacity to reach the charging station after the time period has elapsed.

FIG. 12 shows the vehicle 10 parked at the destination D. The vehicle 10 or the mobile device 50 associated with the user of the vehicle 10 uses the location of the destination D (or its current location from the GNSS location-determining system 120 of the vehicle 10 or of the mobile device 50) to determine the distance to the charging station CS, e.g. the user's home, workplace, closest charging station, etc. The route R from the destination D to the charging station CS is then determined. The amount of charge needed to travel the route R is then estimated by downloading the temperature profile from the weather server 250 as described above. The battery status prediction module 140 may be configured to determine if the predicted battery status is below the minimum battery capacity needed to travel the route R to the charging station CS. If the battery status prediction module 140 determines that the predicted battery status is below the minimum battery capacity, the battery status prediction module 140 generates and outputs an alert to the user that the predicted battery capacity at the end of the time period is estimated to be insufficient to travel the distance from the destination D along route R to the charging station CS. The alert may be displayed on the mobile device 50 and/or on a display of the vehicle 10, or both.

Figure 13:
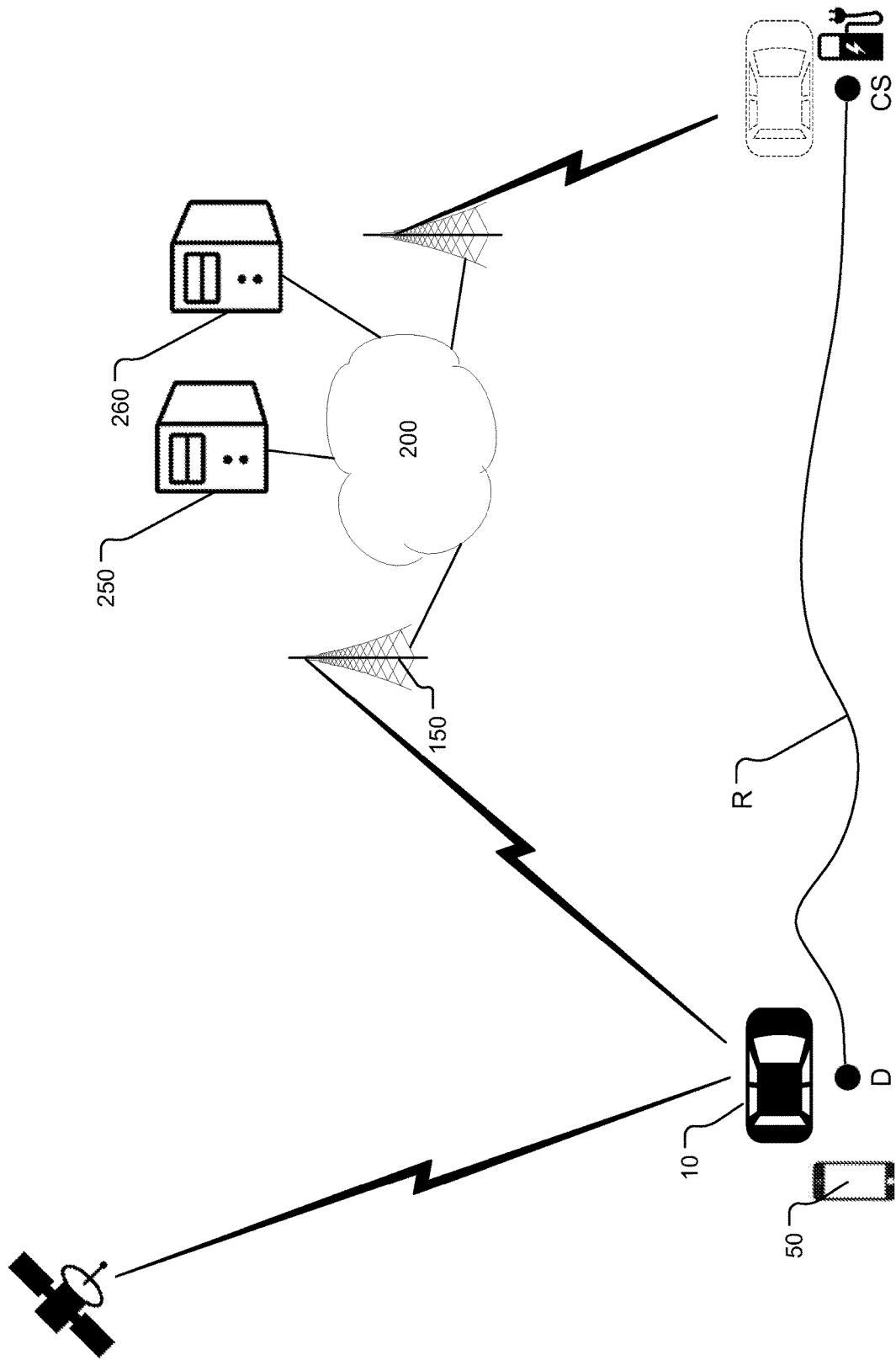
FIG. 13 is a schematic depiction of the vehicle determining a distance along a route to a charging station as well as traffic conditions along the route to assess whether there will be sufficient battery capacity to reach the charging station after the time period has elapsed.

In the embodiment depicted in FIG. 13, the battery status prediction module 140 cooperates with the radiofrequency transceiver 110 to obtain historical traffic data for a route from the destination to the charging station for the day and time corresponding to the end of the time period when the user is predicted to return to the vehicle and then travel along the route to the charging station. The traffic data may be downloaded from a traffic server 260 connected to the internet 200 and accessible by the vehicle 10 and/or mobile device 50 via the base transceiver station 150. The extended travel time due to traffic is used by the battery status prediction module to determine if there is sufficient battery capacity to teach the charging station. If the vehicle has sufficient battery status to travel the route R given the traffic delays, the BSPM 140 may notify the user that there is sufficient range for the vehicle 10 to reach the charging station CS. If the vehicle has insufficient battery charge due to the traffic delays, the BSPM 140 may notify the user that there not enough range for the vehicle 10 to reach the charging station CS.

Figure 14:
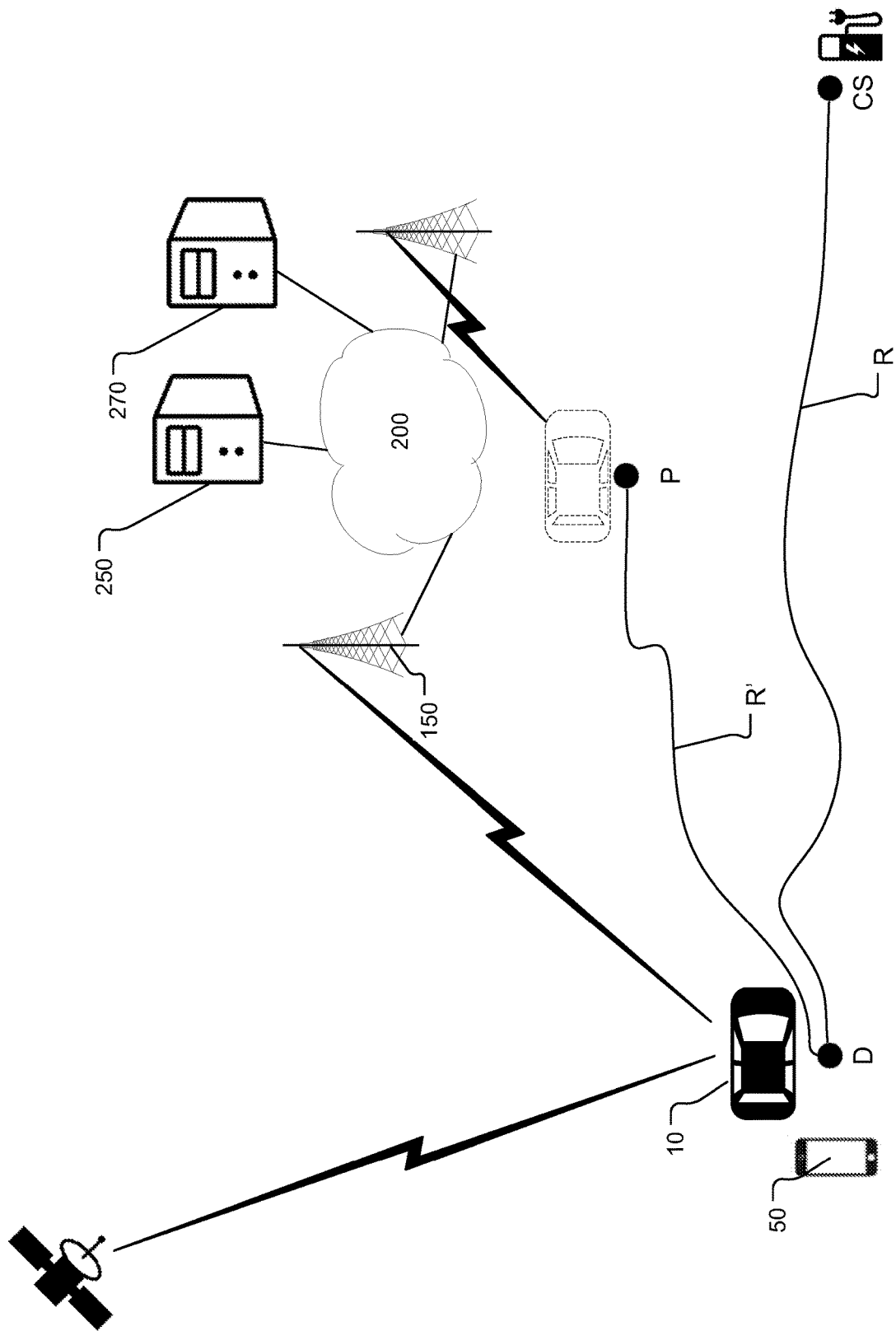
FIG. 14 is a schematic depiction of the vehicle determining, and then traveling to, an alternate warmer parking place P for the vehicle to be parked for the time period.

In the embodiment depicted in FIG. 14, the battery status prediction module (BSPM) 140 finds a warmer parking place nearby the destination D and sends a relocation request to the user to permit relocation of the vehicle 10 to the warmer parking place P. The route R' to the warmer parking place P is then computed to determine how much battery will be expended to travel that alternate route R' and then back to the destination D when the user will return. In a variant, the autonomous electric vehicle 10 automatically relocates without requesting permission from the user. The BSPM 140 may optionally download parking data from a parking-availability server 270. The server 270 may provide recommendations to nearby warmer parking places, e.g. indoor parking lots where the vehicle can be parked for a longer term. In a variant, the autonomous electric vehicle 10 may use a user-predetermined geofence or maximum distance within which the autonomous electric vehicle 10 is authorized by the user to travel without requesting permission. In a further variant, if no suitable parking space is located by the autonomous electric vehicle within the geofence or maximum distance, the autonomous electric vehicle may then send a permission request to the mobile device of the user.

Figure 15:
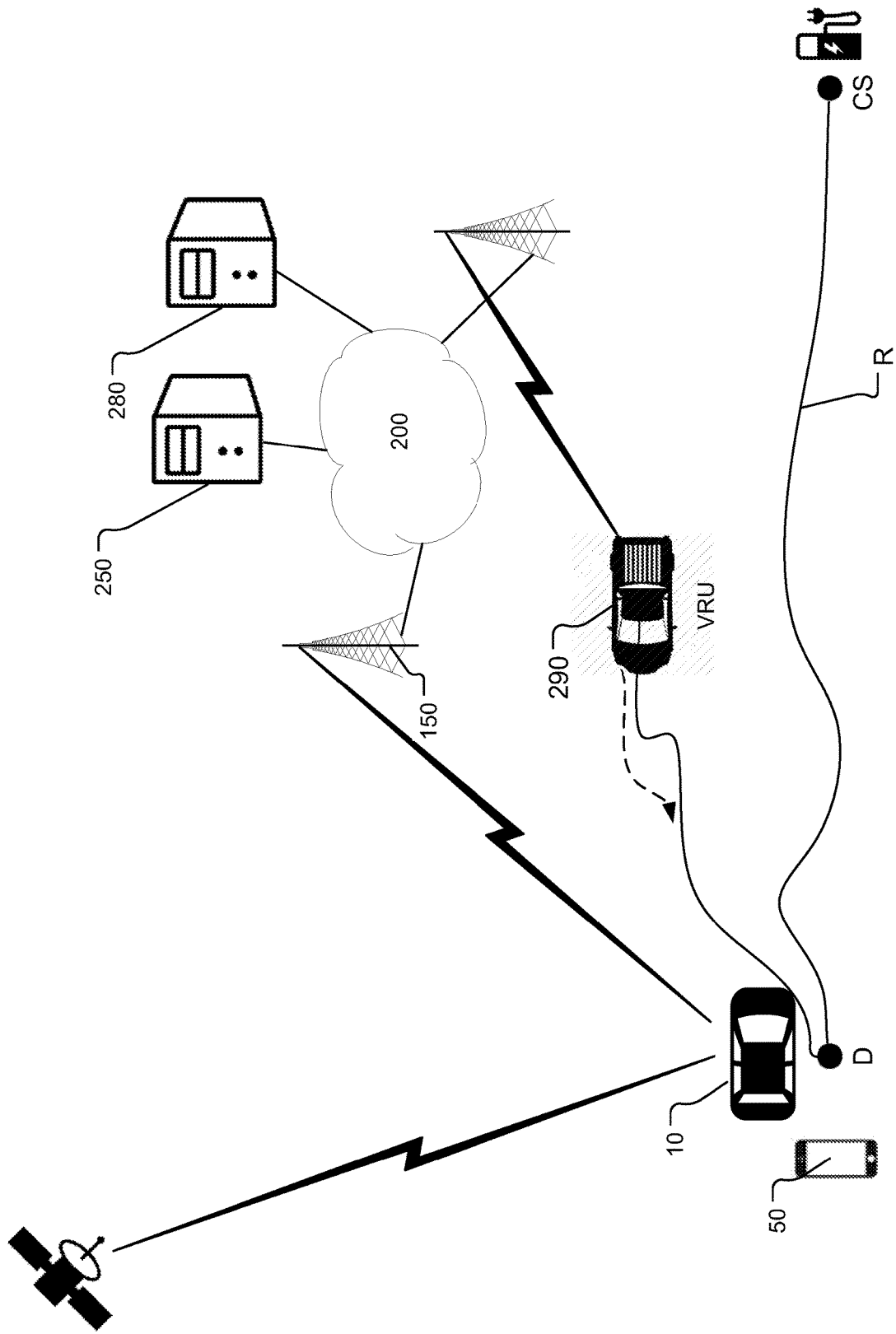
FIG. 15 is a schematic depiction of a vehicle-recharging unit (VRU) traveling to the vehicle to recharge the vehicle in response to a request sent from the vehicle or mobile device.

In the embodiment depicted in FIG. 15, the battery status prediction module (BSPM) 140 cooperates with the radiofrequency transceiver 110 to request a vehicle recharging unit (VRU) 290 to recharge the battery of the vehicle 10. In this embodiment, the BSPM 140 and radiofrequency transceiver 110 communicate a request message to a VRU dispatch server 280 that acknowledges the request message with an acknowledgement and then communicates with an available vehicle recharging unit 290 near the vehicle to dispatch the VRU 290 to the destination D where the electric vehicle 10 is parked to enable the VRU 290 to recharge the battery of the electric vehicle 10. In one embodiment, the battery status prediction module 140 cooperates with the radiofrequency transceiver 110 to send a battery-recharge notification to the mobile device 50 of the user to indicate that the vehicle recharging unit 290 has recharged the battery of the user's electric vehicle 10. The battery status prediction module 140 may further send a request message to the server 280 to schedule the VRU to recharge the vehicle's battery on a specific day and time or if a certain precondition occurs, e.g. the temperature falls below a predetermined threshold or if the temperature remains below a predetermined threshold for a predetermined amount of time.

In one embodiment, the battery status prediction module 140 cooperates with the radiofrequency transceiver 110 to receive a travel-change message from the mobile device 50 of the user indicating that the user will return after an extended time period, i.e. a longer period than originally determined. The battery status prediction module 140 recalculates the predicted battery status corresponding to the extended time period and sends a reply via the radiofrequency transceiver 110 to the mobile device 50 of the user whether the predicted battery status based on the extended time period will have sufficient capacity to travel to the charging station.

In one embodiment, the battery status prediction module 140 is configured to download weather updates during the time period to revise the predicted battery status. The frequency of the weather updates may be predetermined by the user in a configuration setting, e.g. every hour, every 4 hours, every 12 hours, etc.

In one embodiment, the battery status prediction module 140 is configured to determine if the predicted battery status has changed by more than a predetermined amount. If the predicted battery status has changed by more than the predetermined amount, the battery status prediction module 140 sends an update to the mobile device 50 of the user. For example, if the battery status prediction module 140 detects a degradation of a percentage, e.g. 5%, 10%, 20%, 25%, etc. in the battery charge capacity or voltage, the battery status prediction module 140 sends an update to the mobile device 50 of the user.

In one embodiment, the battery status prediction module 140 outputs a vehicle-departure message to the user that the vehicle has departed the destination to travel to the charging station due to an insufficient predicted battery status. In this embodiment, the vehicle-departure message may include an indication of the time that the vehicle expects to be back in its original parking place. In this embodiment, the vehicle may send an update message to the mobile device of the user to indicate how long the vehicle may remain in the parking place once its battery has been recharged, given the predicted weather.

In one embodiment, the battery status prediction module 140 outputs a vehicle-departure permission request message to the user asking the user to confirm that the vehicle 10 may depart the destination to travel to the charging station due to an insufficient predicted battery status.

In another implementation, the vehicle 10 is a human-driven electric vehicle. The electric vehicle 10 comprises a chassis 12, wheels 14 rotationally mounted to the chassis, an electric motor 16 mechanically connected to one or more of the wheels for driving the one or more of the wheels, and a battery 18 electrically connected to the electric motor for powering the electric motor 16. The electric vehicle 10 includes a parked-status prediction module 145 for predicting from historical usage patterns a destination where the vehicle 10 will be parked. The parked-status prediction module 145 collects location and time data for the vehicle to determine where the vehicle is habitually parked. For example, the vehicle 10 may be frequently parked at home overnight and on the weekends, at a workplace during weekdays, and at a train station or airport every second Thursday when the user goes on a regular overnight business trip. If the parked-status prediction module 145 detects the vehicle heading toward, for example, the train station on a Thursday, the parked-status prediction module 145 infers that the vehicle will be parked at the train station overnight.

The parked-status prediction module 145 can thus infer or determine the destination of the vehicle from the usage patterns. The parked-status prediction module 145 generates an output signal indicative of a predicted time period when the vehicle will be parked based on historical usage patterns.

The battery status prediction module 140 executed by the processor 100 is thus configured to predict, based on the predict time period from the parked-status prediction module 145, a predicted battery status at the end of the time period based on a temperature profile for the time period. As described above, the battery status prediction module 140 obtains the temperature profile from the remote weather server for the time period when the vehicle will be parked. The battery status prediction module 140 then determines if the predicted battery status at the end of the time period will have at least a minimum battery capacity to travel a distance to a charging station. If the predicted battery status is below the minimum battery capacity, the BSPM 140 outputs an alert to the user that the predicted battery capacity at the end of the time period is insufficient to travel the distance to the charging station.

Figure 16:
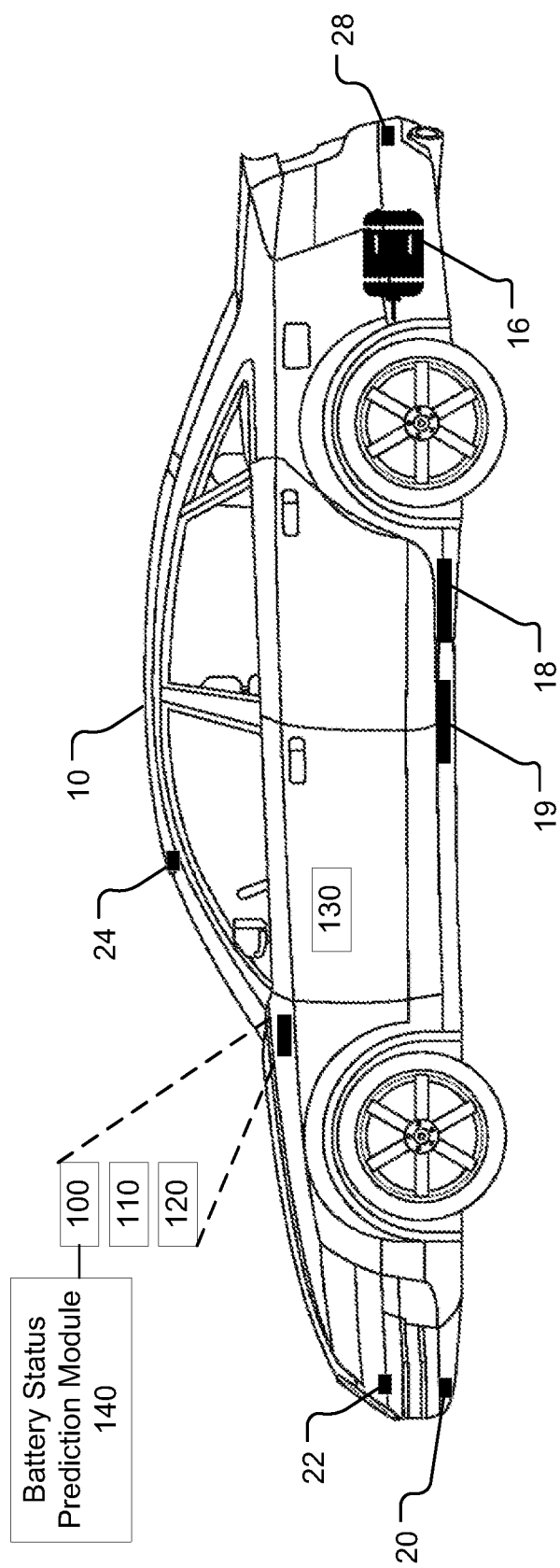
FIG. 16 is a schematic depiction of a vehicle having two different types of batteries.

In one embodiment, as depicted in FIG. 16, the vehicle 10 has two types of batteries, a first battery 18 of a first chemical type and a second battery 19 of a second chemical type. For example, one battery type may be lithium-based batteries, e.g. lithium-ion or lithium polymer batteries whereas another battery type may be a lead acid battery or alternatively nickel-based batteries, e.g. nickel-cadmium or nickel-metal hydride. In this embodiment, the first battery 18 and the second battery 19 have first and second temperature-dependent storage properties such that the second battery is more suitable for cold weather than the first battery. In this embodiment, the BSPM 140 causes a portion of the electric charge in the first battery to be conducted to the second battery in response to a determination that the vehicle will be parked at a low temperature. The BSPM 140 may apply a time threshold and/or a temperature threshold to determine whether to transfer the portion of the electric charge from the first battery 18 to the second battery 19. In one embodiment, the electric charge may be transferred back from the second battery 19 to the first battery 18 if the BSPM 140 determines that the vehicle 10 is departing the destination or if the user of the vehicle returns to the vehicle sooner than originally predicted. For example, the first battery 18 may be a lithium-ion battery with inorganic electrodes whereas the second battery 19 may be a lithium-ion battery having organic electrodes. In one specific example, the second battery 19 may an anode made of polyimide and a cathode made of polytriphenylamine. In this specific embodiment, the second battery 19 may have an electrolyte made of ethyl acetate.

Figure 17:
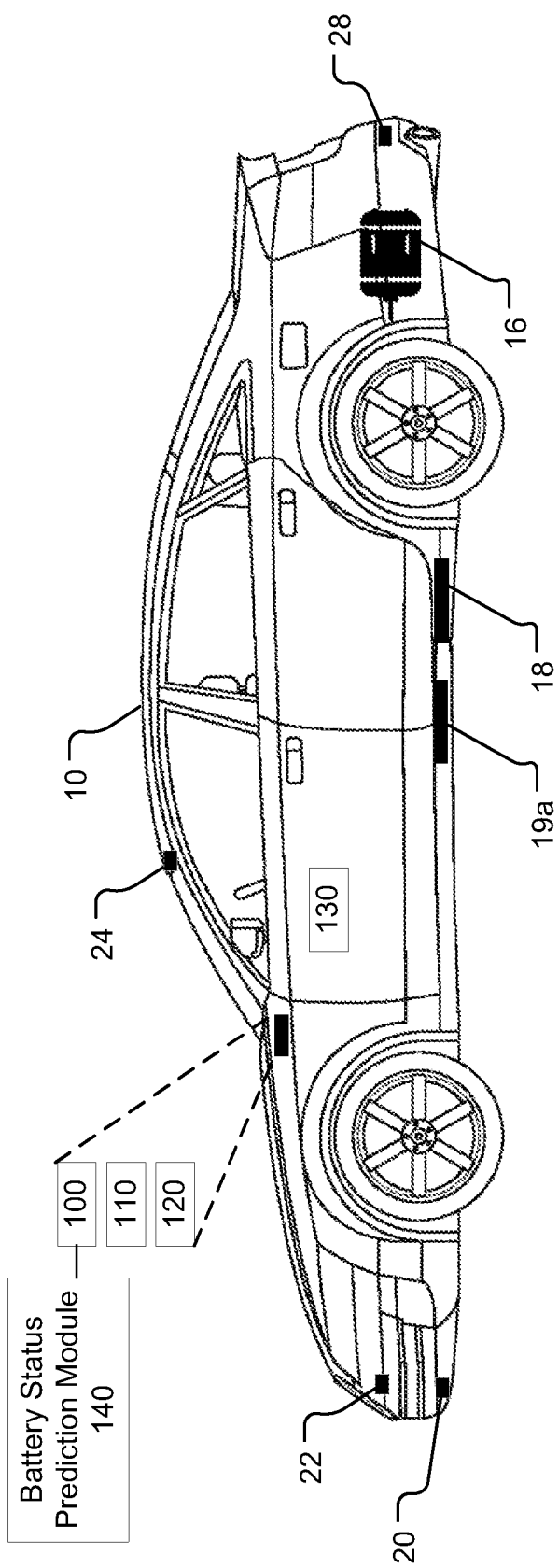
FIG. 17 is a schematic depiction of a vehicle having a battery and an ultracapacitor.

In another embodiment, as depicted in FIG. 17, the vehicle 10 has a battery 18 and an ultracapacitor 19*a*. For example, the battery 18 may be a lithium-ion or lithium polymer battery. In this embodiment, the BSPM 140 causes a portion of the electric charge in the battery 18 to be conducted to the ultracapacitor 19*a* in response to a determination that the vehicle will be parked at a low temperature. The BSPM 140 may apply a time threshold and/or a temperature threshold to determine whether to transfer the portion of the electric charge from the battery 18 to the ultracapacitor 19*a*. In one embodiment, the electric charge may be transferred back from the ultracapacitor 19*a* to the battery 18 if the BSPM 140 determines that the vehicle 10 is departing the destination or if the user of the vehicle returns to the vehicle sooner than originally predicted.

In another implementation, the BSPM 140 computes a temperature-adjusted range based on the current and/or predicted temperature. If the BSPM 140 predicts that the vehicle will be exposed to low temperature(s), the BSPM 140 computes a range-degradation factor based on the low temperature(s) to be encountered and then adjusts the projected range of the vehicle 10 to determine the temperature-adjusted range. The vehicle navigation system may receive the temperature-adjusted range from the BSPM 140 and then notify the user whether there is sufficient range to reach a particular destination that is input into the navigation system by the user. For example, in response to the user inputting a destination in the navigation system, the vehicle computes the temperature-adjusted range based on the projected temperature along the route to the destination. The vehicle then informs the user whether the vehicle has sufficient range to reach the destination. Optionally, the temperature-adjusted range of the vehicle is then displayed on a vehicle display. Optionally, the vehicle identifies a charging station to recharge the battery or batteries of the vehicle based on the temperature-adjusted range. Optionally, the vehicle identifies an alternate route to avoid a cold weather zone where the battery will be depleted faster than if the route is through a warmer weather zone. Optionally, the vehicle automatically reduces its power consumption in response to determining that the temperature-adjusted range is less than a predetermined threshold. Reducing power consumption may entail reducing the vehicle speed, or accelerating more gently, or performing regenerative braking more efficiently. Reducing power consumption may entail shutting down unnecessary onboard systems such as an onboard entertainment systems, reducing air conditioning, etc.

In some implementations, the mobile device 50 interacts with the vehicle 10 to present information to the user of the mobile device with respect to the battery status of the vehicle. The mobile device 50 includes a mobile device processor coupled to a mobile device memory. The mobile device 50 includes a mobile device display to display the information for the user. The mobile device 50 also includes a mobile device user interface, e.g. the display may be a touch-sensitive display. The mobile device user interface enables the user to provide input to the mobile device for remotely interacting with the vehicle 10.

Figure 18:
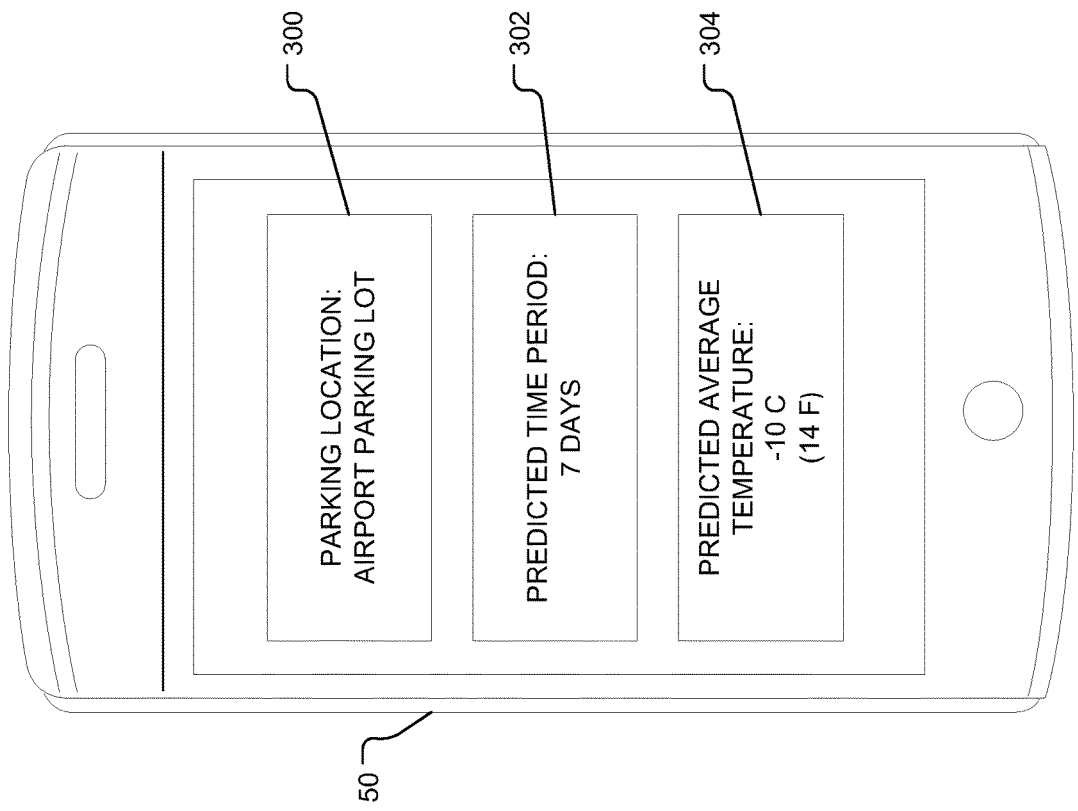
FIG. 18 depicts a mobile device displaying a parking location, a predicted time period during which the vehicle will be parked and a predicted average temperature for the time period.

FIG. 18 depicts the mobile device 50 displaying a parking location 300, a predicted time period 302 during which the vehicle will be parked and a predicted average temperature 304 for the time period. For example, the parking location is the predicted destination of the vehicle as described above. The location may be defined by an address, a neighbourhood, a town, a city, a point-of-interest, or simply by GNSS location coordinates. In this example, the parking location is presented to the user onscreen as the airport parking lot. The mobile device stores GNSS location coordinates in association with this location. The predicted time period is the time during which the vehicle will be parked. The predicted average temperature (expressed in either Fahrenheit and/or Celsius) is obtained from the weather server 250 as described above. In one embodiment, the vehicle temperature sensor is used to calibrate or adjust the temperature data obtained from the weather server 250. For example, if the vehicle sensor reads one degree warmer than the temperature received from the weather server, the vehicle may adjust the temperature profile by one degree to account for the micro-climate where the vehicle is parked or, for example, for any local heat sources such as a building vent or other proximate heat source and the exposure to direct sunshine. To aid the vehicle in choosing a parking place that is exposed to the direct sun, the vehicle may use an onboard light sensor and/or a map that takes building elevations into account so as to determine if a particular location is in the sun or shadow of a building, trees, or other sun-obstructing structures when the weather server reports that the sun is out.

Figure 19:
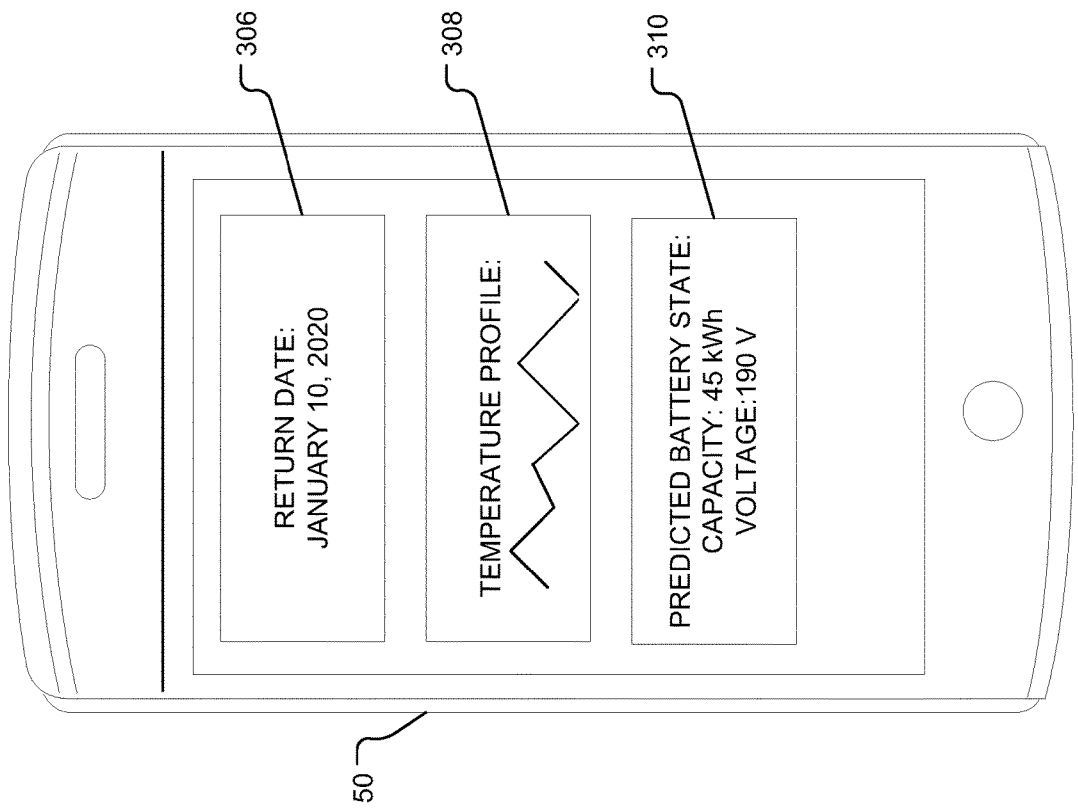
FIG. 19 depicts a mobile device displaying a return date, temperature profile and predicted battery status.

FIG. 19 depicts the mobile device 50 displaying a return date 306, a temperature profile 308 and a predicted battery status 310. The temperature profile 308 may include temperature data in graphical form (as shown) and/or numerical data. The predicted battery status may include capacity and voltage as illustrated.

Figure 20:
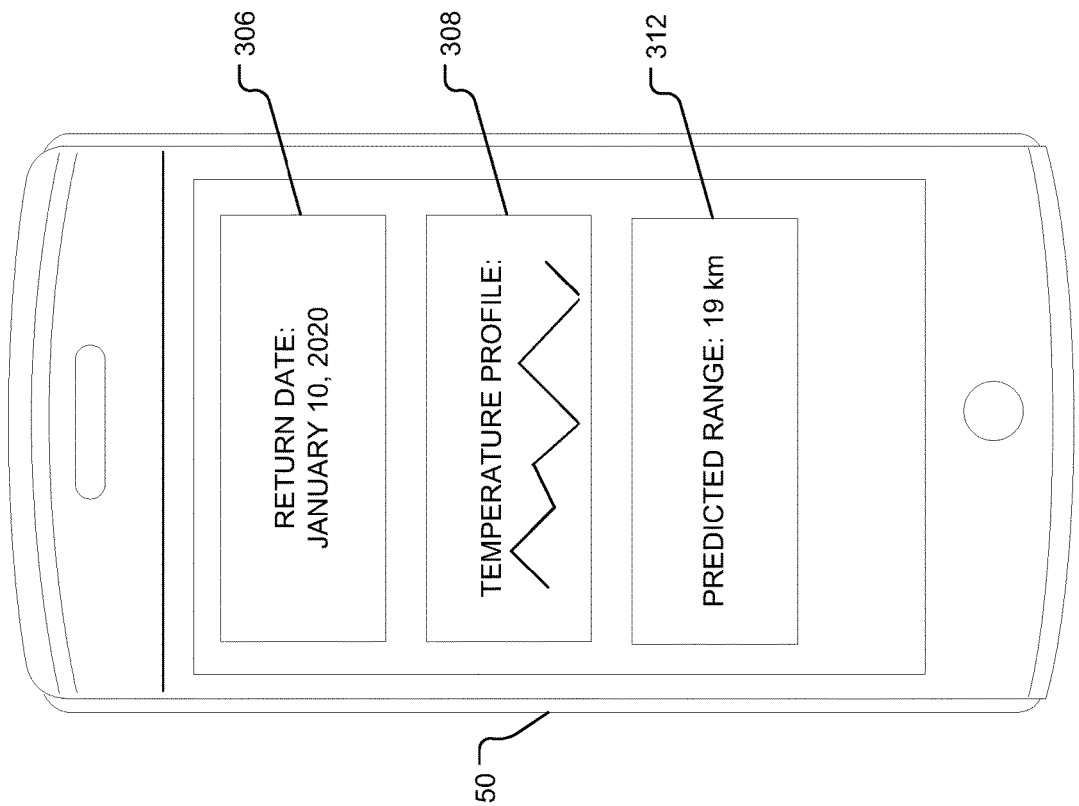
FIG. 20 depicts a mobile device displaying a return date, temperature profile and predicted range.

In a variant depicted in FIG. 20, the mobile device 50 displays the return date 306 and the temperature profile 308 as well as a predicted range 312.

Figure 21:
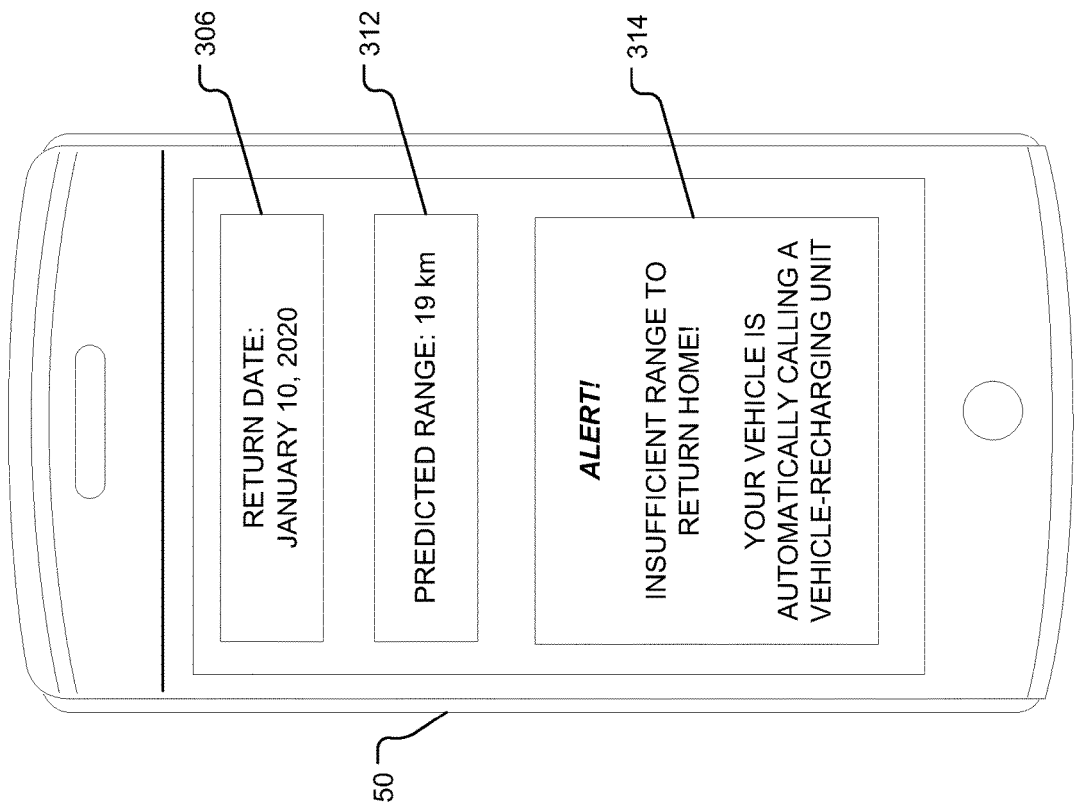
FIG. 21 depicts a mobile device displaying a return date, a predicted range and a range alert that there is insufficient range to return home.

In another variant depicted in FIG. 21, the mobile device 50 displays the return date 306, the predicted range 312 and a range alert 314 that there is insufficient range to return home. The range alert 314 may include a notification that the vehicle is automatically calling a vehicle-recharging unit.

Figure 22:
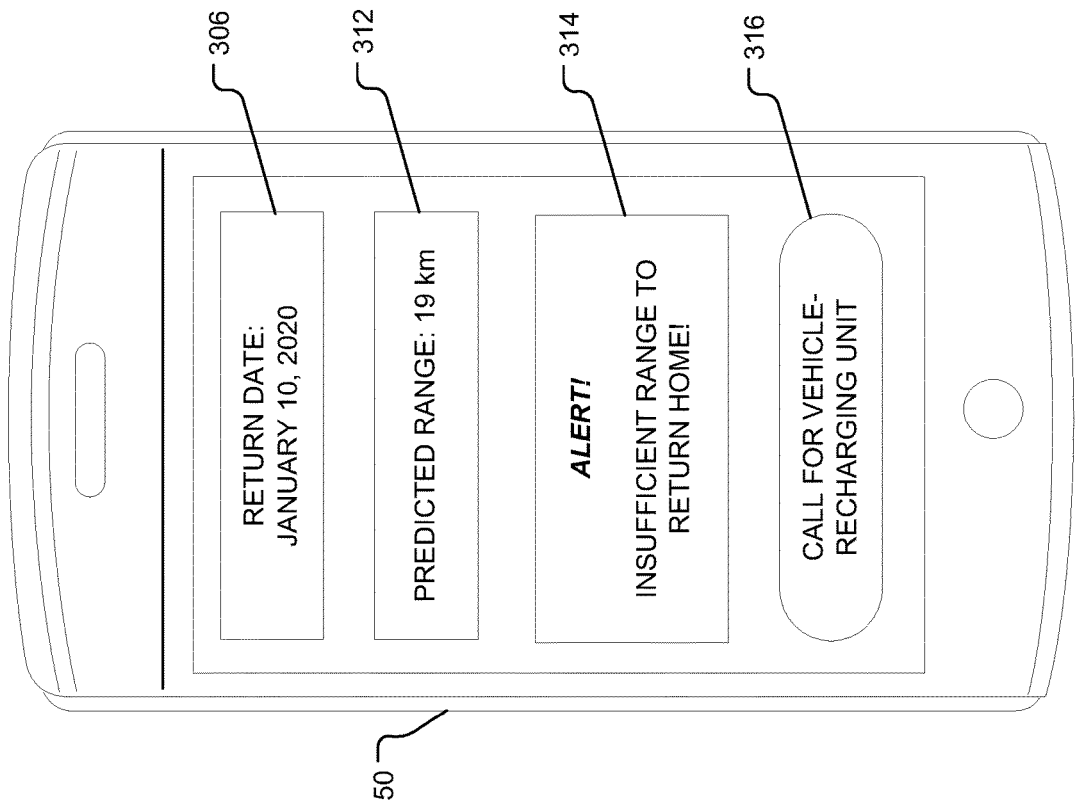
FIG. 22 depicts a mobile device displaying a return date, predicted range, range alert, and a user interface element to initiate a call to request a vehicle-recharging unit.

In another variant depicted in FIG. 22, the mobile device 50 displays the return date 306, the predicted range 312 and the range alert 314 as described above and further displays a user interface element 316 to call for a vehicle-recharging unit to come to the location where the vehicle is parked to recharge the vehicle.

Figure 23:
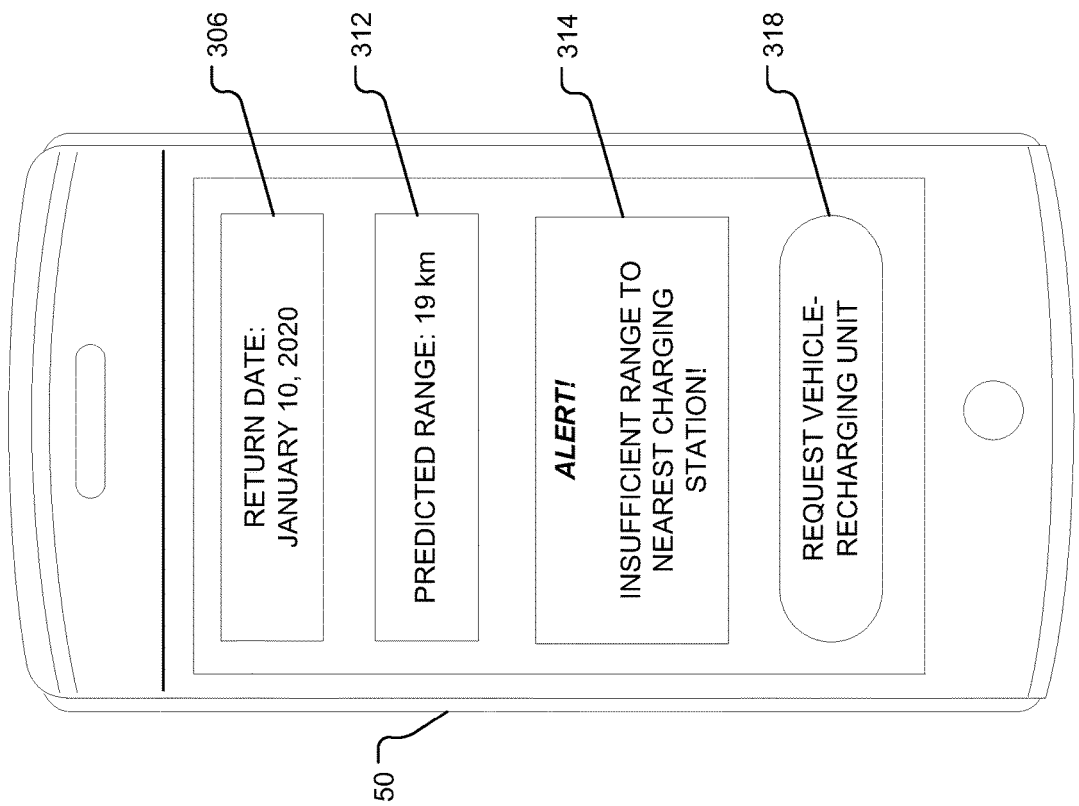
FIG. 23 depicts a mobile device displaying a return date, predicted range, range alert, and a user interface element to send a message to request a vehicle-recharging unit.

In a further variant depicted in FIG. 23, the mobile device 50 displays the return date 306, the predicted range 312, the range alert 314, and a user interface element 318 to send a message to request a vehicle-recharging unit. The message may be sent as a request through a website, an e-mail or an SMS.

Figure 24:
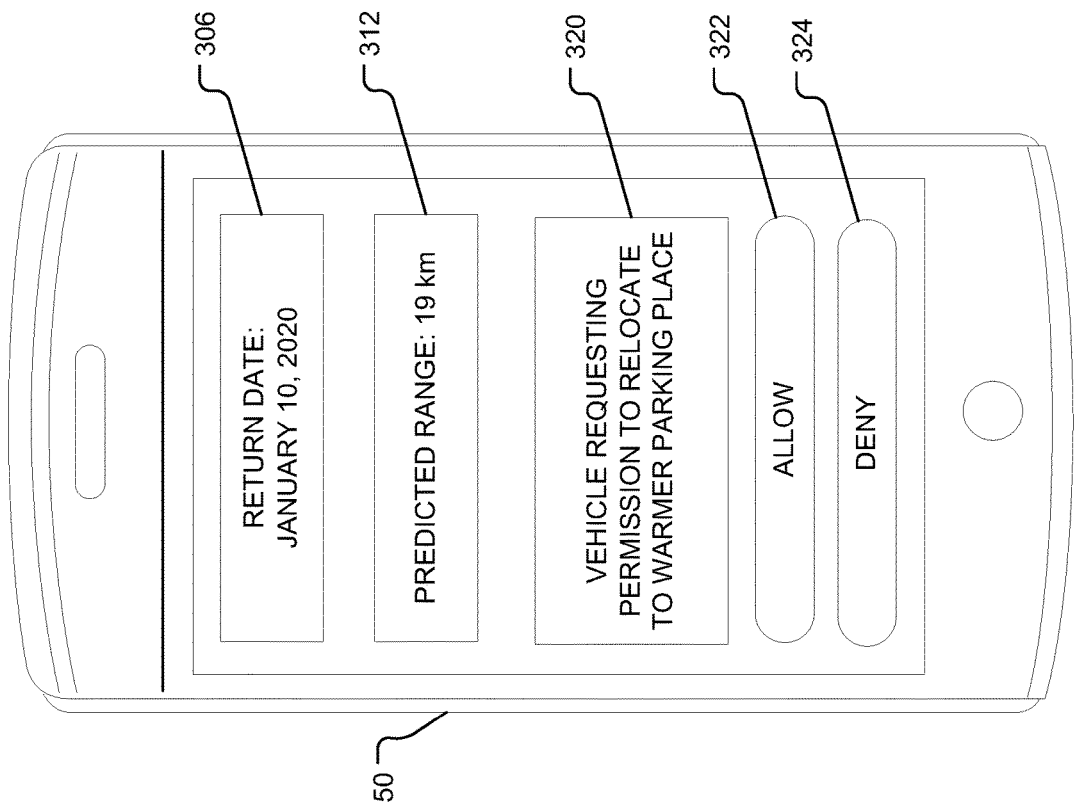
FIG. 24 depicts a mobile device displaying a return date, predicted range, and a relocation-permission request, and user interface elements to allow or deny the relocation-permission request.

In the embodiment depicted in FIG. 24, the mobile device 50 displays the return date 306, the predicted range 312, and a relocation-permission request 320. The mobile device 50 also displays user interface elements 322, 324 (i.e. an allow button 322 and a deny button 324) to allow or deny the relocation-permission request. The vehicle sends the relocation-permission request 320 in response to a determination by the BSPM that the vehicle's battery will have depleted too much to permit the vehicle to travel home or to the nearest charging station. If the user touches the allow button 322, the mobile device 50 transmits a relocation-permission message to the vehicle 10. In response to receiving the relocation-permission message, the vehicle 10 autonomously relocates to the warmer parking place. If the user touches the deny button 324, the mobile device 50 transmits a relocation-denial message to the vehicle 10 to instruct the vehicle 10 to remain in its current parking place. Optionally, the parking fee for the parking lot is displayed in the message to the user. Optionally, the vehicle seeks out the least expensive parking place.

Figure 25:
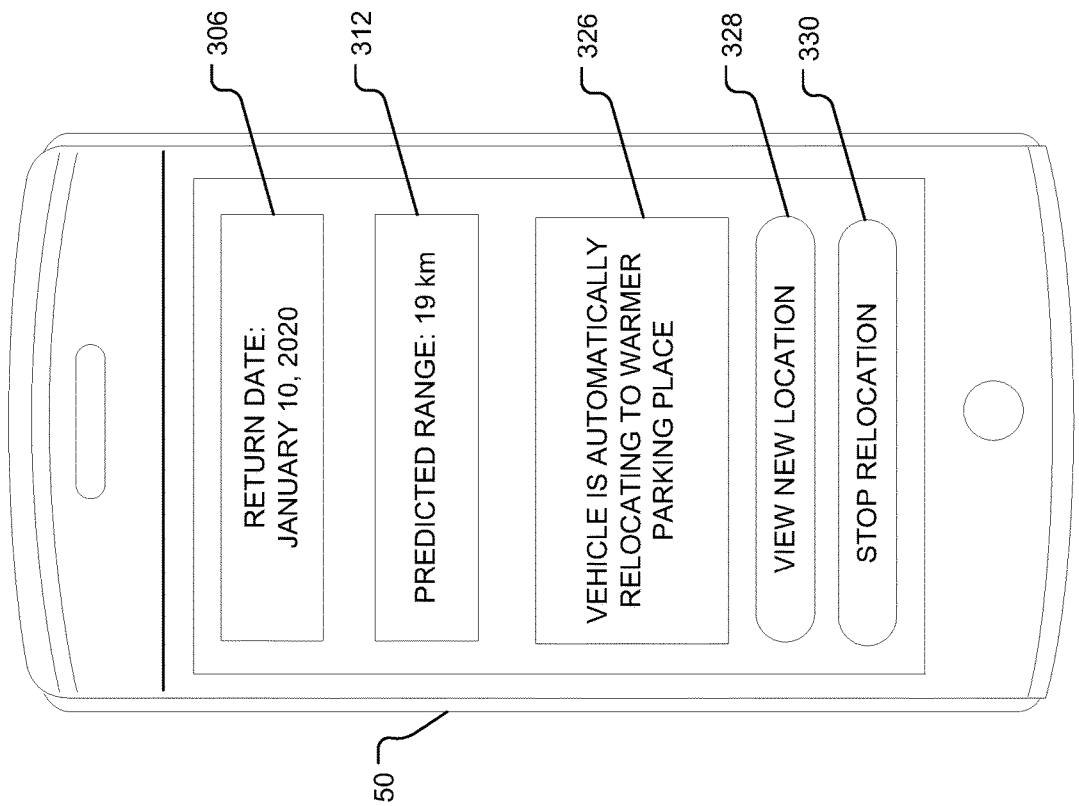
FIG. 25 depicts a mobile device displaying a return date, predicted range, and a relocation notification, and user interface elements to view the new location or to stop the relocation.

In the embodiment depicted in FIG. 25, the mobile device 50 displays the return date 306, the predicted range 312, and a relocation notification 326. The mobile device 50 also displays user interface elements 328, 330 to enable the user to view the new location (e.g. a view new location button 328) or to stop the relocation (e.g. a stop relocation button 330). The relocation notification 326 notifies the user of the mobile device 50 that the vehicle is automatically relocating to a warmer parking place. In response to the user touching the view new location button 328, the mobile device displays the new location of the warmer parking place, e.g. on a map. Viewing the new location may be done prior to, during, or after the relocation. In response to the user touching the stop relocation button 330, the mobile device transmits to the vehicle a stop command to stop the vehicle from relocating to the warmer parking place. If received after the vehicle has departed the original parking place, the vehicle will return to the original parking place in response to receipt of the stop command.

Figure 26:
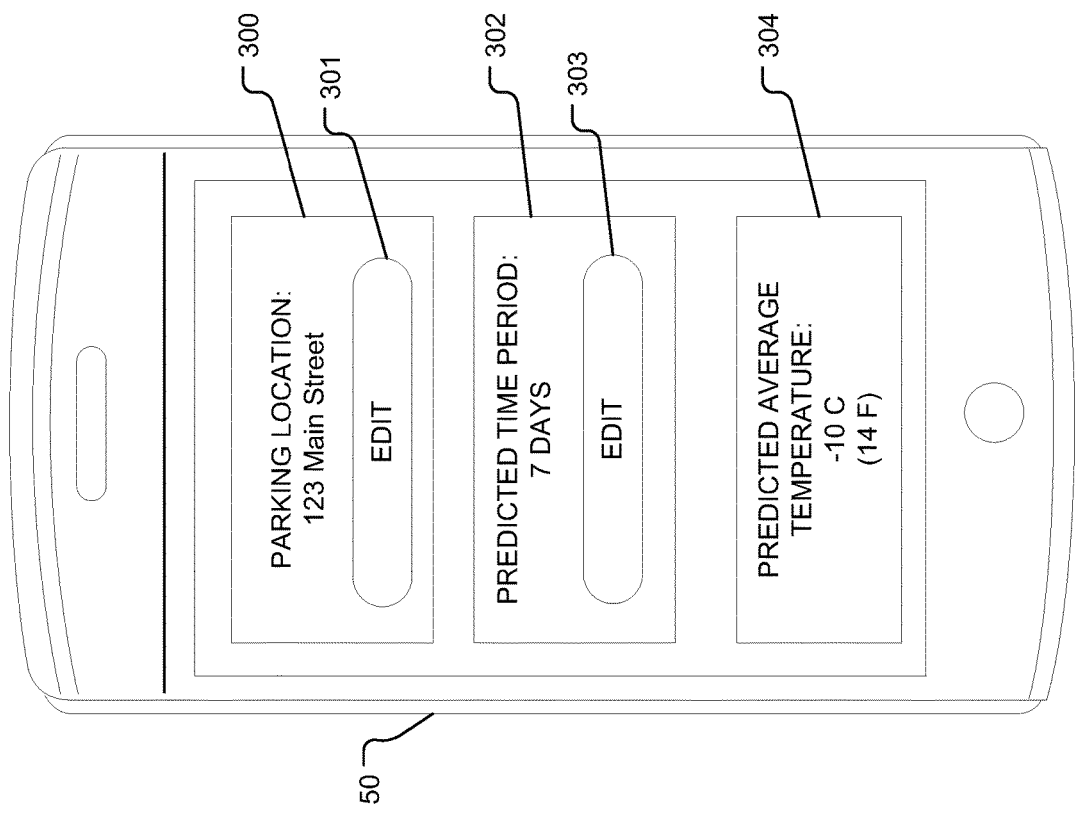
FIG. 26 depicts a mobile device displaying a predicted parking location, a predicted time period and a predicted average temperature as well as user interface elements to edit the predicted parking location and the predicted time period.

In the embodiment depicted in FIG. 26, the mobile device 50 displays the predicted parking location 300, the predicted time period 302 and the predicted average temperature 304 as well as user interface elements 301, 303 to edit the predicted parking location and the predicted time period, respectively. The mobile device 50 includes a location edit button 301 and a time period edit button 303. In response to receiving user input via the location edit button 301, the mobile device 50 displays an element (not shown) to input a new location. The element may for example be a text field to receive textual input. The mobile device 50 may suggest the current location from a mobile device GNSS receiver inside the mobile device itself as the new location. The mobile device may suggest a list of potential new locations from points of interest nearby. The mobile device may display a map of the current location and surrounding area and permit the user to select the new location from the map.

In response to receiving user input via the time edit button 303, the mobile device 50 displays an element (not shown) to input a new time period when the vehicle will be parked. This enables the user to override the assumption or inference made by the BSPM. For example, the BSPM may infer from a hotel reservation that the vehicle will be parked for only five days but the user knows that the vehicle will be parked for longer than five days because the user intends to stay with a family member after checking out from the hotel. The mobile device may receive user input specifying a revised time period by displaying a text field to enter the duration of the time period. For example, the user can input a time period of 8 days to replace the predicted time period of 5 days. As will be described below, other means to specify the time period may be used such as a pull-down menu of days or a calendar from which to select the return date.

Figure 27:
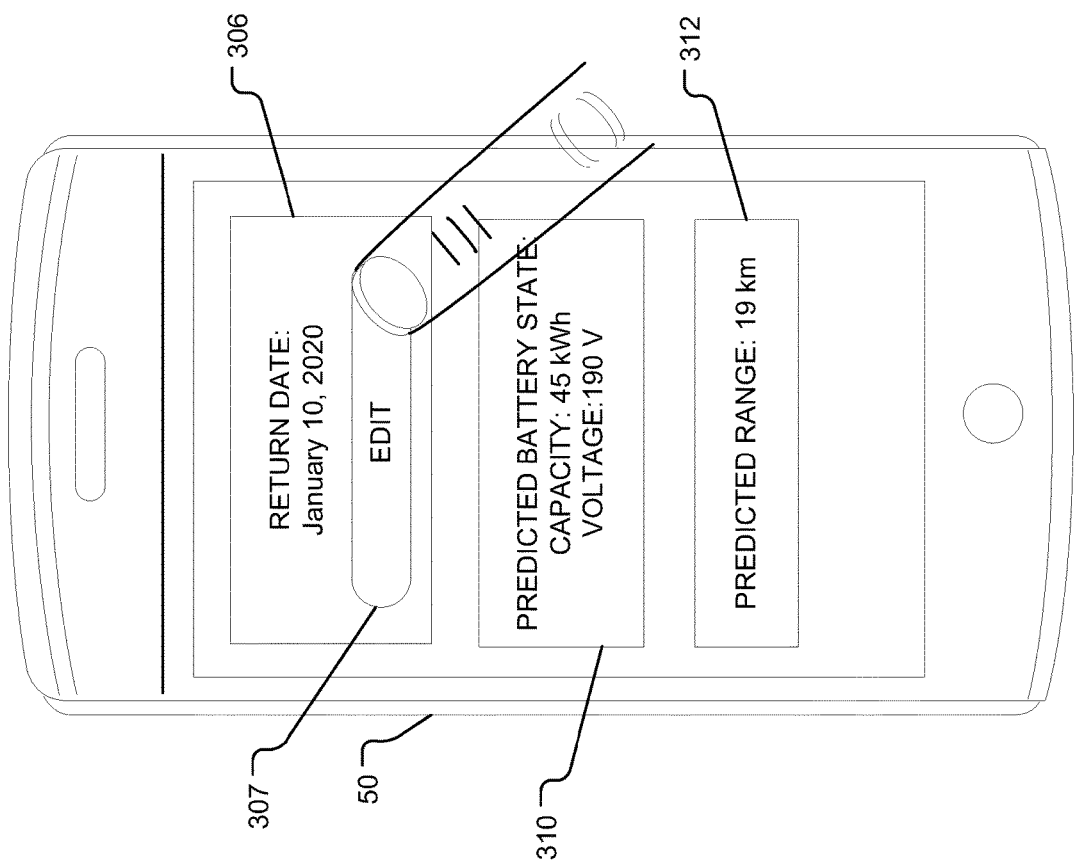
FIG. 27 depicts a mobile device displaying a predicted return date, predicted battery state and predicted range as well as a user interface element to edit the predicted return date.

In the embodiment illustrated in FIG. 27, the mobile device 50 displays the predicted return date 306, the predicted battery state 310 and the predicted range 312 as well as a user interface element 307 to edit the predicted return date, i.e. return date edit button 307. In response to receiving user input via the return date button 307, the mobile device displays a calendar to enable the user to specify a new return date.

Figure 28:
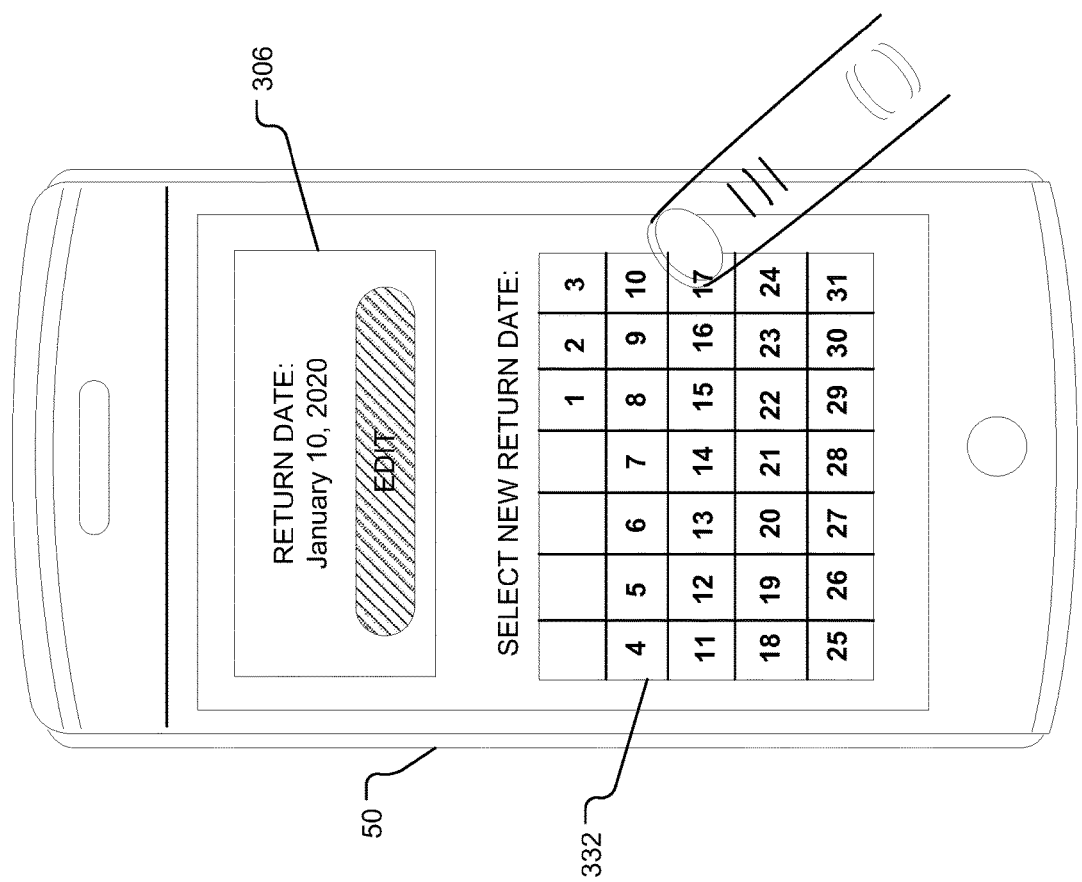
FIG. 28 depicts the mobile device of FIG. 27 subsequently displaying a calendar to enable the user to input a new return date.

FIG. 28 depicts the mobile device 50 of FIG. 27 subsequently displaying the calendar 332 to enable the user to input a new return date by selecting the date by touching the corresponding number on the calendar. In this example, the user selects Jan. 17, 2020 from the calendar 332 as the new return date to override the originally predicted return date that was predicted by the BSPM based on, for example, event data extracted from the mobile device.

Figure 29:
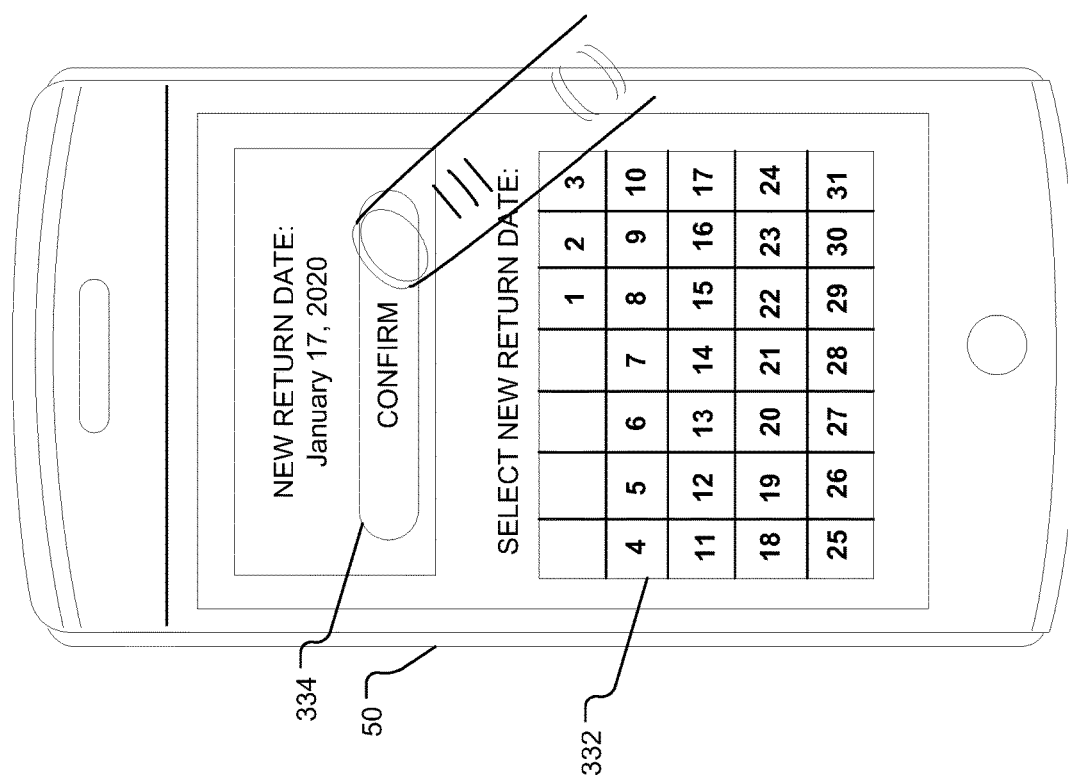
FIG. 29 depicts the mobile device of FIG. 28 subsequently displaying a user interface element to confirm that the date selected by the user from the calendar is the new return date.

FIG. 29 depicts the mobile device 50 of FIG. 28 subsequently displaying a user interface element (e.g. confirm button 334) to confirm that the date selected by the user from the calendar 332 is the new return date.

Figure 30:
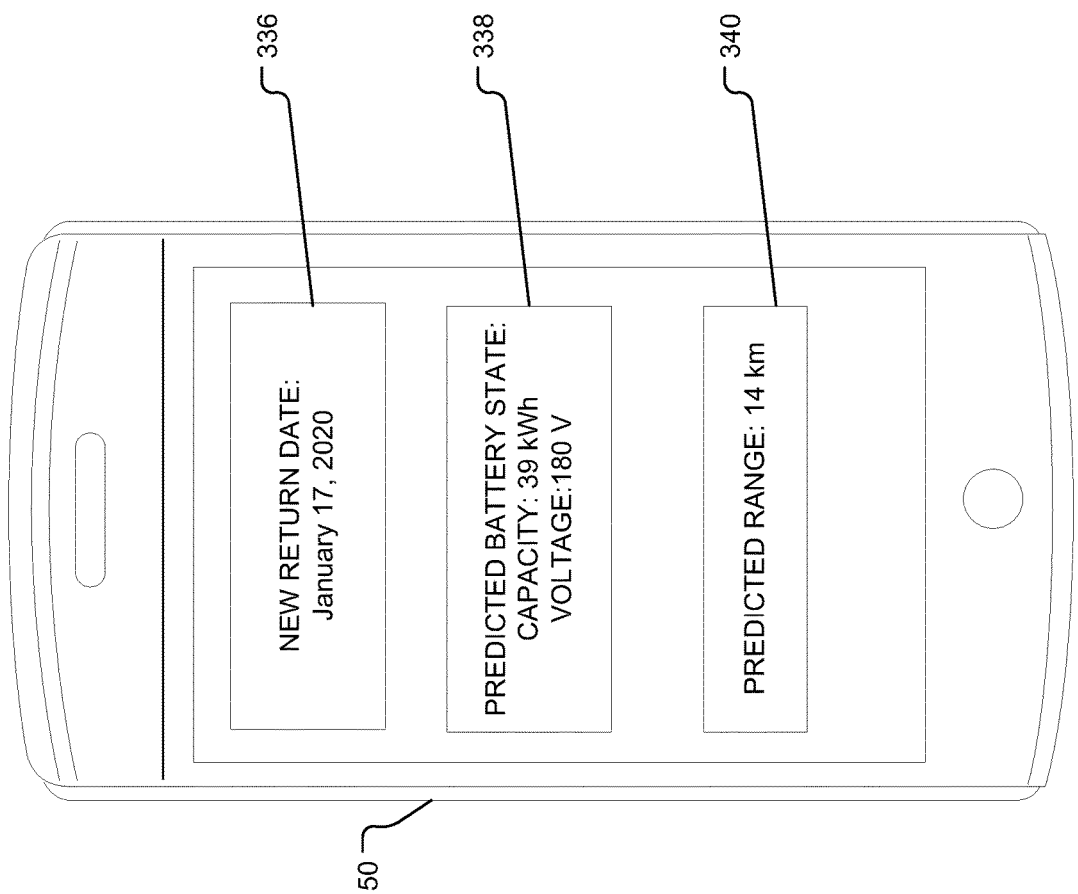
FIG. 30 depicts the mobile device of FIG. 29 subsequently displaying the new return date, the updated predicted battery state and the updated predicted range.

FIG. 30 depicts the mobile device 50 of FIG. 29 subsequently displaying the new return date 336, the updated predicted battery state 338 and the updated predicted range 340. Note that in this example, the predicted ranged has dropped 5 km from 19 km to 14 km, battery capacity dropped from 45 kWh to 39 kWh, and voltage dropped from 190V to 180V as a result of the prolonged exposure to the cold weather. The numbers are merely presented to illustrate how the capacity, voltage and range have dropped due to the prolonged exposure to the cold weather.

Figure 31:
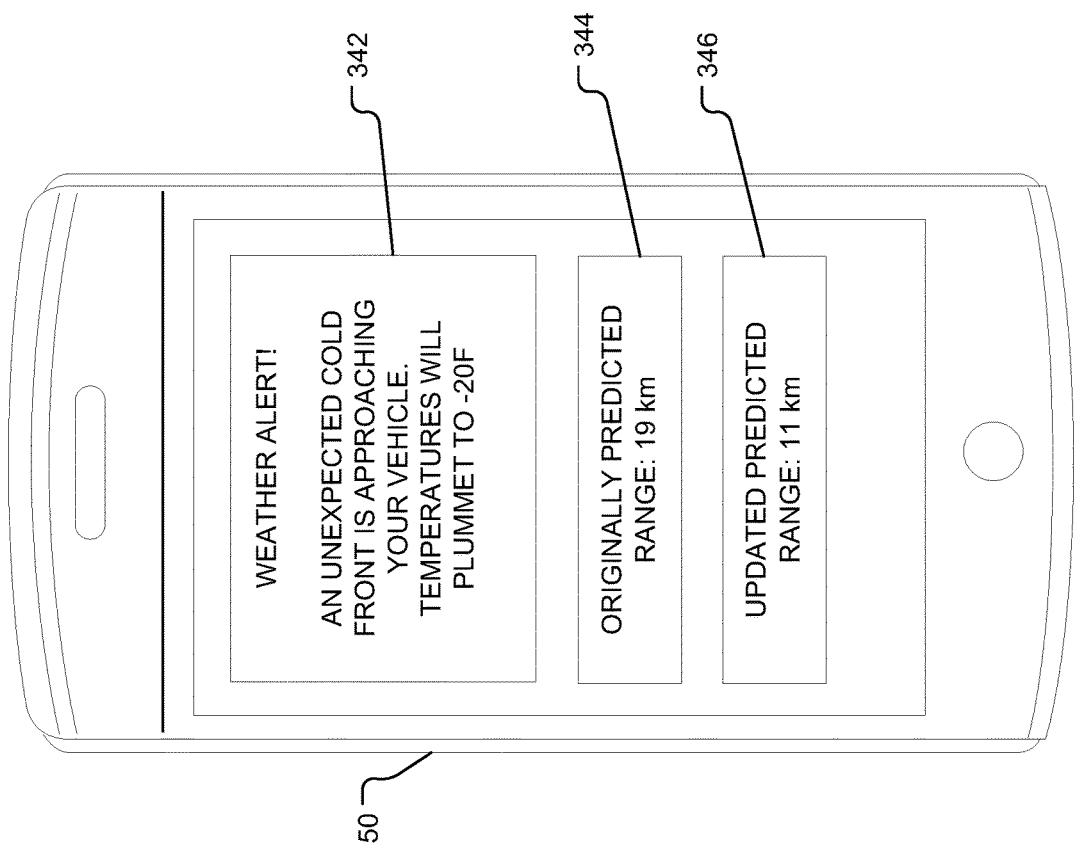
FIG. 31 depicts a mobile device displaying a weather alert, the originally predicted range and the updated predicted range.

In accordance with another embodiment, FIG. 31 depicts a mobile device 50 displaying a weather alert 342, the originally predicted range 344 and the updated predicted range 346. The weather alert 342 may include textual information about the nature of the weather or the change in weather. For example, in FIG. 31, the weather alert notifies the user of the mobile device that an unexpected cold front is approaching the vehicle and that temperatures are expected to plummet to −20 F. In this example, this is a drastic change in the temperature profile from what was originally predicted. As a consequence, the originally predicted battery status is no longer accurate and should be updated. The BSPM updates the predicted range and displays the updated predicted range 346. Optionally, the originally predicted range 344 may be omitted from this display.

Figure 32:
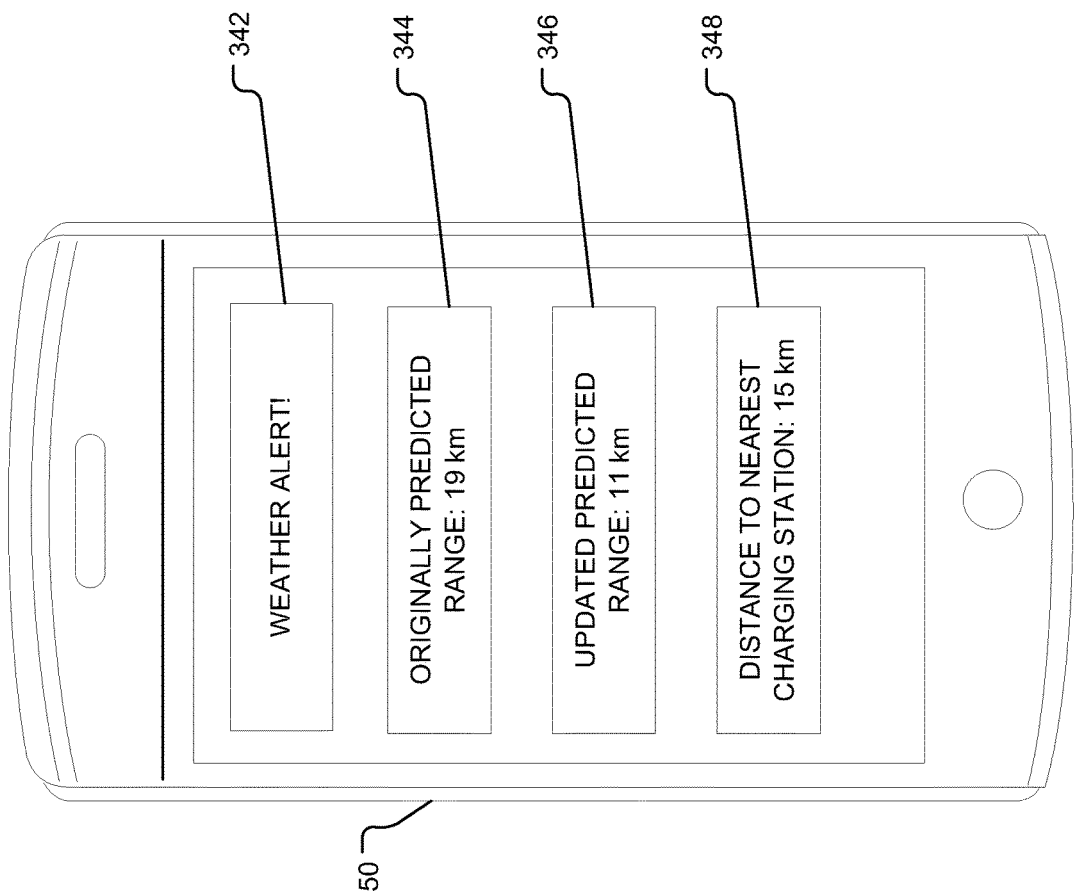
FIG. 32 depicts a mobile device displaying a weather alert, the originally predicted range and the updated predicted range as well as the distance to the nearest charging station.

FIG. 32 depicts a variant in which the mobile device 50 displays the weather alert 342, the originally predicted range 344 and the updated predicted range 346 and further displays the distance 348 to the nearest charging station. In this example, the updated predicted range 346 is insufficient to travel the distance 348 to the nearest charging station whereas the originally predicted range 344 was sufficient to travel the distance 348 to the nearest charging station.

Figure 33:
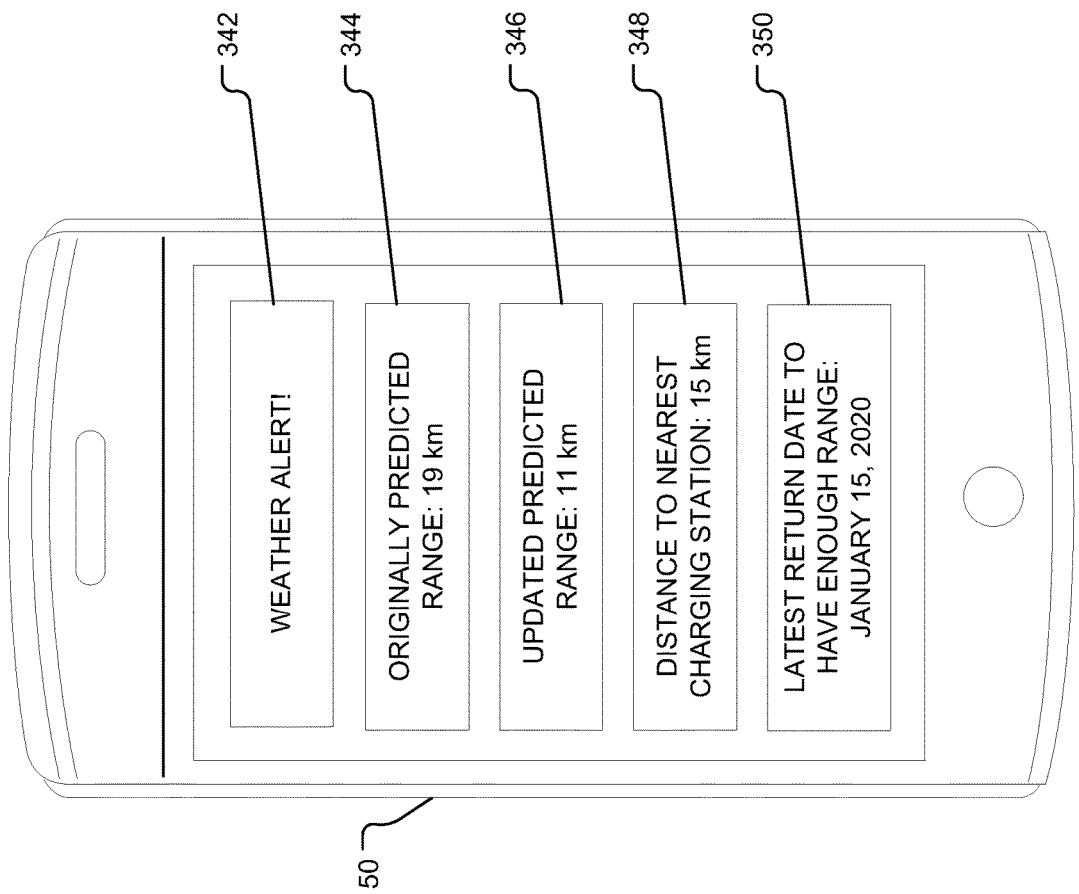
FIG. 33 depicts a mobile device displaying a weather alert, the originally predicted range and the updated predicted range as well as the distance to the nearest charging station and also the latest return date to have enough range to reach the nearest charging station.

FIG. 33 depicts another variant in which the mobile device 50 displays the weather alert 342, the originally predicted range 344 and the updated predicted range 346 as well as the distance 348 to the nearest charging station and also the latest return date 350 to have enough range to reach the nearest charging station. The user thus know the latest date that he or she may return to the vehicle and still have enough charge to reach the nearest charging station.

Figure 34:
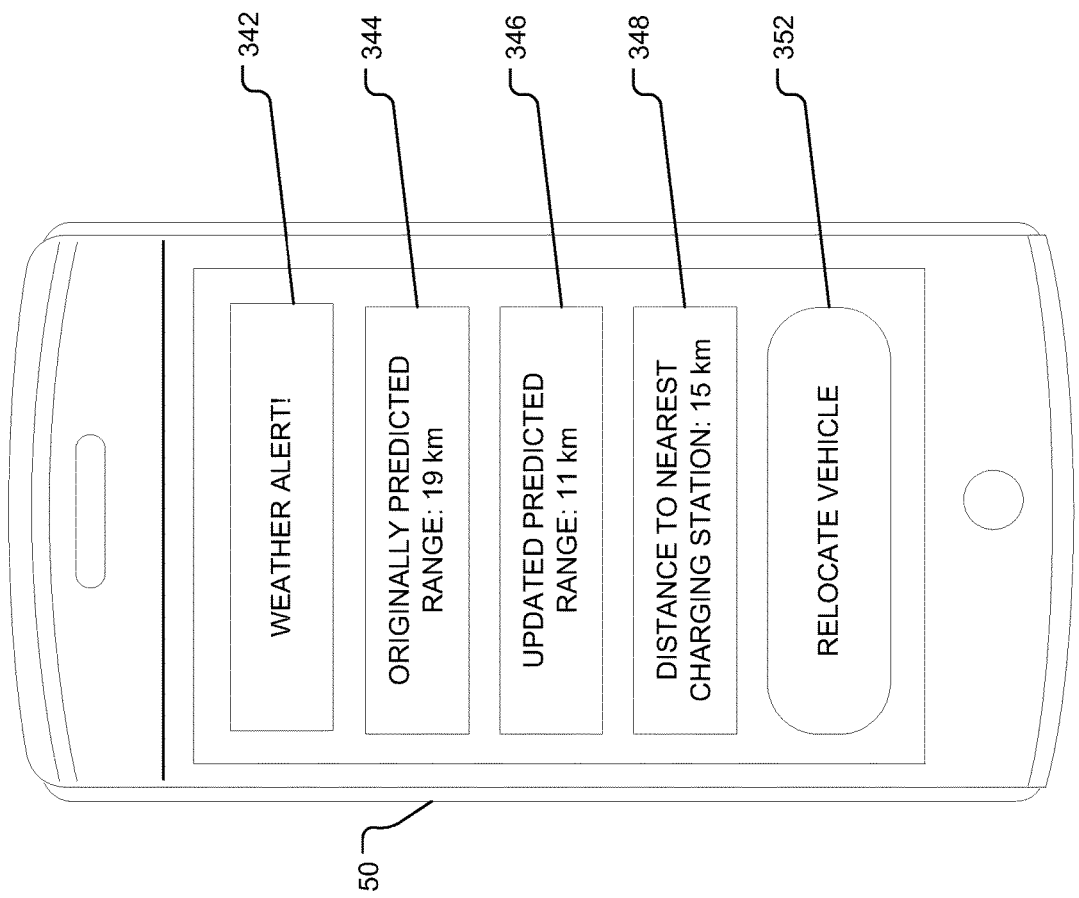
FIG. 34 depicts a mobile device displaying a weather alert, the originally predicted range and the updated predicted range as well as the distance to the nearest charging station and also a user interface element to relocate the vehicle.

FIG. 34 depicts a further variant in which the mobile device 50 displays the weather alert 342, the originally predicted range 344, the updated predicted range 346, and the distance 348 to the nearest charging station and further displays a user interface element (relocate vehicle button 352) to relocate the vehicle.

Figure 35:
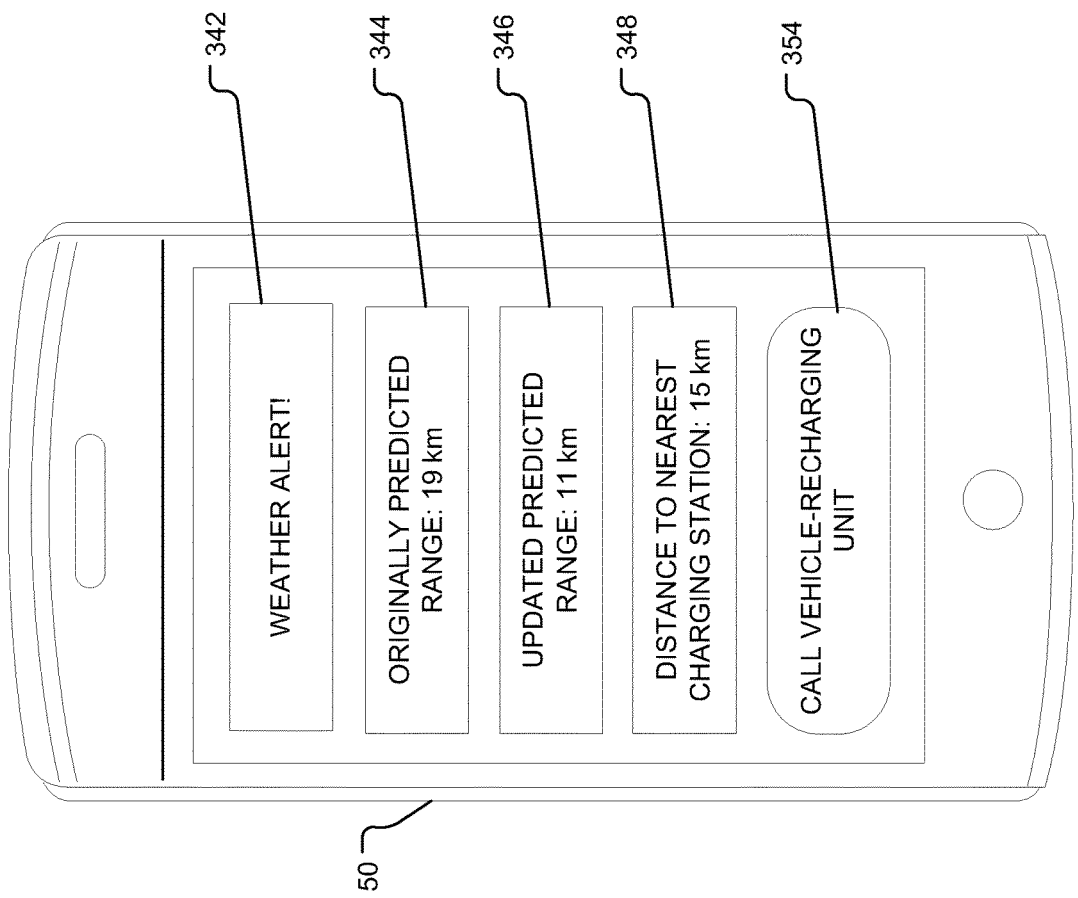
FIG. 35 depicts a mobile device displaying a weather alert, the originally predicted range and the updated predicted range as well as the distance to the nearest charging station and also a user interface element to call a vehicle-recharging unit.

In a variant, the mobile device 50 of FIG. 35 displays the weather alert 342, the originally predicted range 344, the updated predicted range 346, the 348 distance to the nearest charging station and also a user interface element to call a vehicle-recharging unit (call vehicle-recharging unit button 354).

Figure 36:
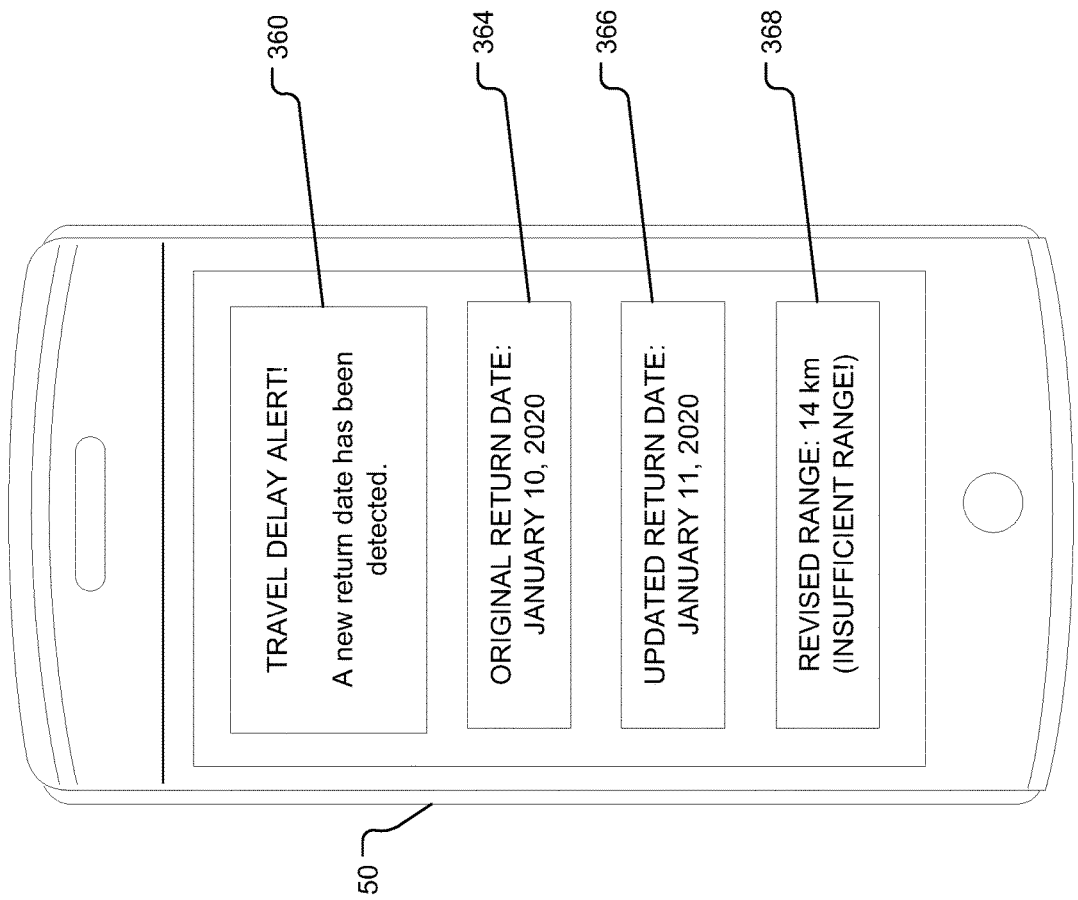
FIG. 36 depicts a mobile device displaying a travel delay alert, the original return date, the updated return date and a revised range.

In another embodiment, which is depicted in FIG. 36, a mobile device 50 displays a travel delay alert 360, the original return date 364, the updated return date 366 and a revised range 368 due to the travel delay. In the example presented in FIG. 36, the travel delay alert 360 may optionally include a textual notification that the mobile device 50 has detected a travel delay or has inferred a later return date. The travel date (later return date) may be detected from a variety of sources including reissued electronic tickets, newly booked electronic tickets, modified hotel bookings with extended check-out dates or new hotel bookings, e-mails, texts, SMS messages, social media posts, or other digital content from which the mobile device gleans that the user will not be returning to the vehicle on the originally predicted return date. As a further example, the mobile device 50 may detect that input is provided to the navigation app on the mobile device to navigate the user to a further destination that leads away from the vehicle or from the airport or train station expected to be used to return to the vehicle. In this instance, the mobile device predicts that there will be a travel delay i.e. that the actual return date is not likely to be the originally projected return date. In FIG. 36, the revised range 368 may include a textual notification that the range, due to the prolonged exposure to the cold, will now be insufficient to reach home or the nearest charging station. The travel delay alert may be a flight change alert or a hotel change alert as described below.

Figure 37:
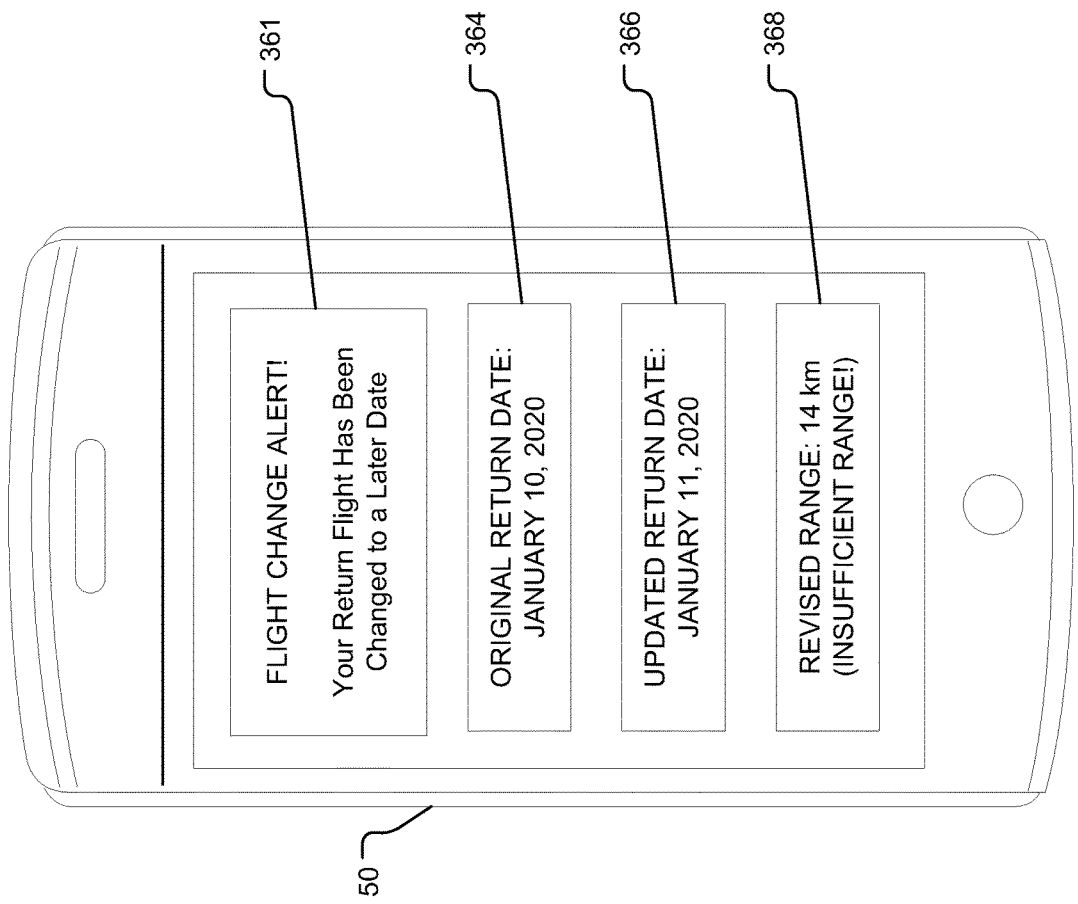
FIG. 37 depicts a mobile device displaying a flight change alert, the original return date, the updated return date and a revised range.

FIG. 37 depicts the mobile device 50 displaying a flight change alert 361, the original return date 364, the updated return date 366 and the revised range 368. The flight change alert may be generated in response to a user-initiated re-booking or cancellation of a return flight. The flight change alert may be generated alternatively in response to an airline-initiated delay or cancellation.

Figure 38:
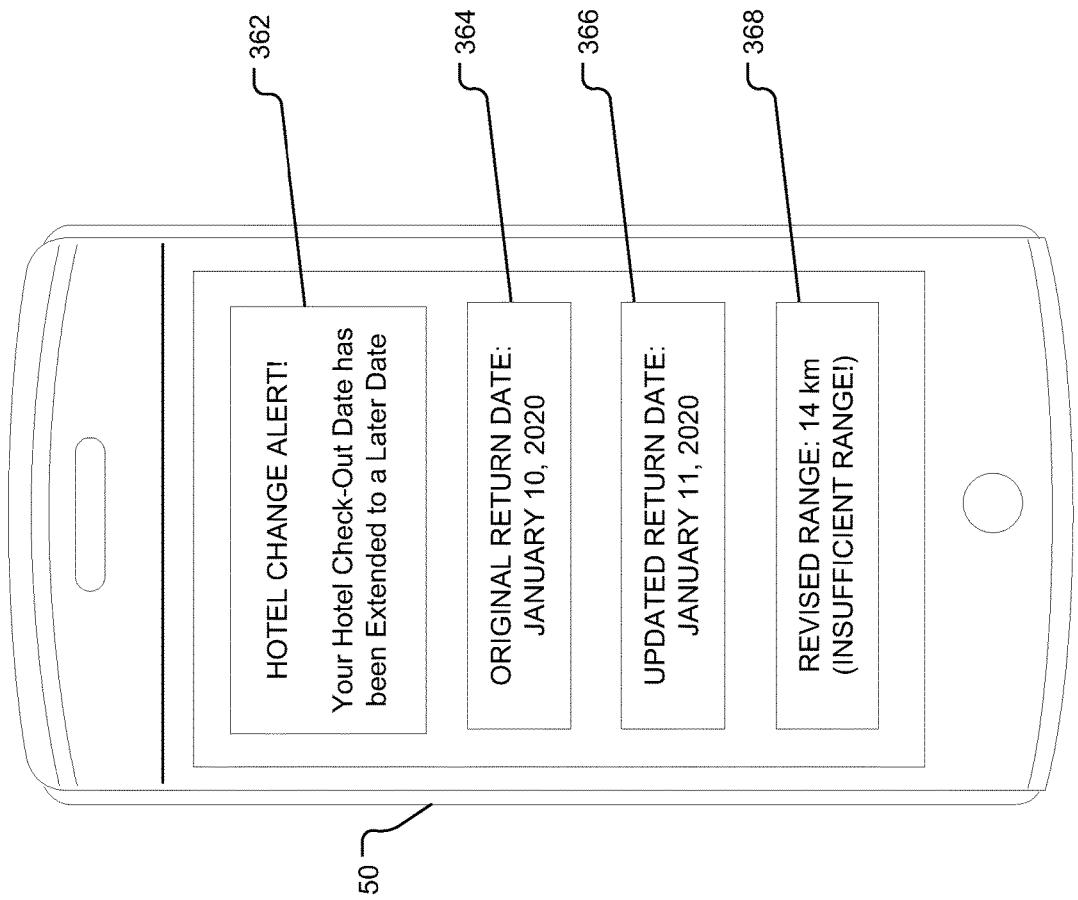
FIG. 38 depicts a mobile device displaying a hotel change alert, the original return date, the updated return date and a revised range.

FIG. 38 depicts the mobile device 50 displaying a hotel change alert 362, the original return date 364, the updated return date 366 and the revised range 368. The hotel change alert may be generated in response to a user-initiated re-booking or stay extension or to an additional hotel booking at a second hotel corresponding to the check-out date of the first hotel.

Figure 39:
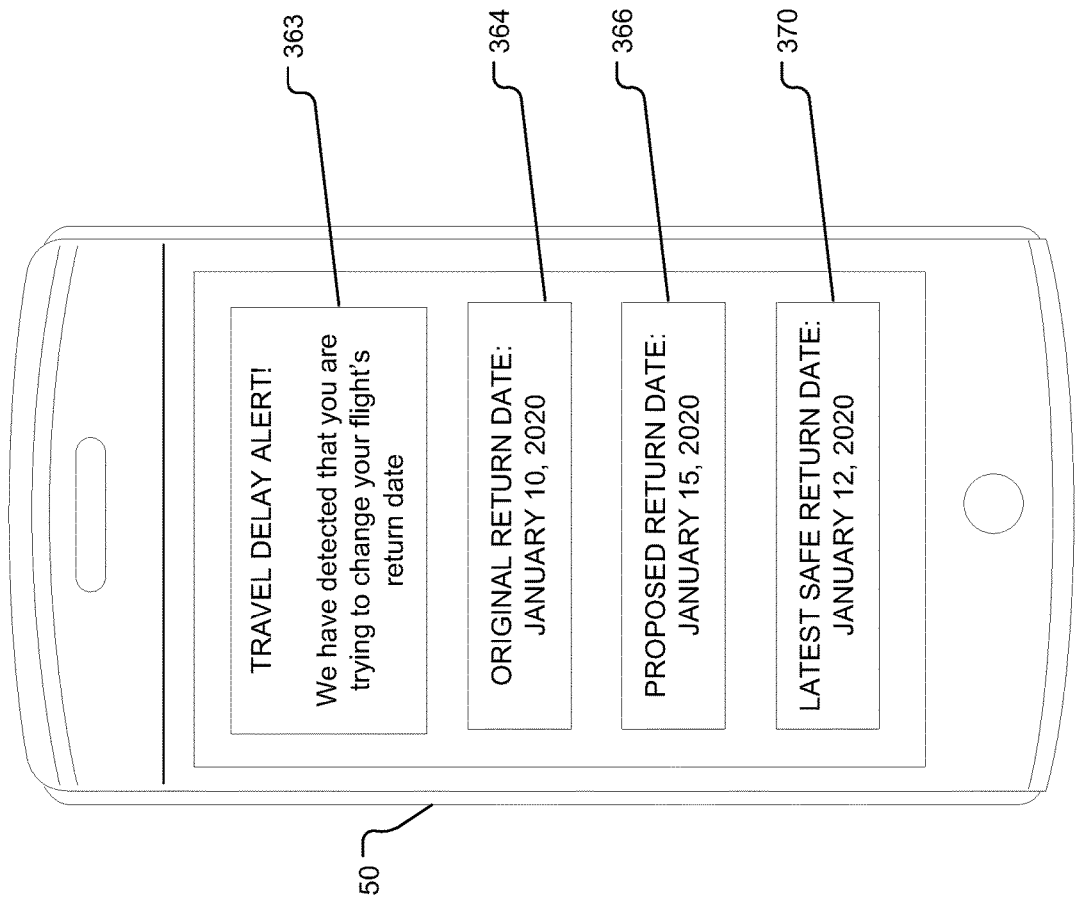
FIG. 39 depicts a mobile device displaying a travel delay alert, the original return date, the updated return date and a latest safe return date.

FIG. 39 depicts the mobile device 50 displaying a pre-emptive travel delay alert 363, the original return date 364, the updated return date 366 and a latest safe return date 370. The pre-emptive travel delay alert is triggered in response to an attempt to change travel plans that will affect the battery status of the vehicle. For example, if the user attempts to change a return flight using a browser of the mobile device, the mobile device will detect that this change in the return flight means that the battery status will be deleteriously affected. The mobile device then displays the latest safe return date 370 to inform the user how late he or she can return without having an overly depleted battery due to the cold weather. Optionally, the mobile device can present a confirmation request to the user to confirm that he or she wishes to nonetheless proceed with the flight change despite the precariously low battery state that will result from the delay in returning to the vehicle.

Figure 40:
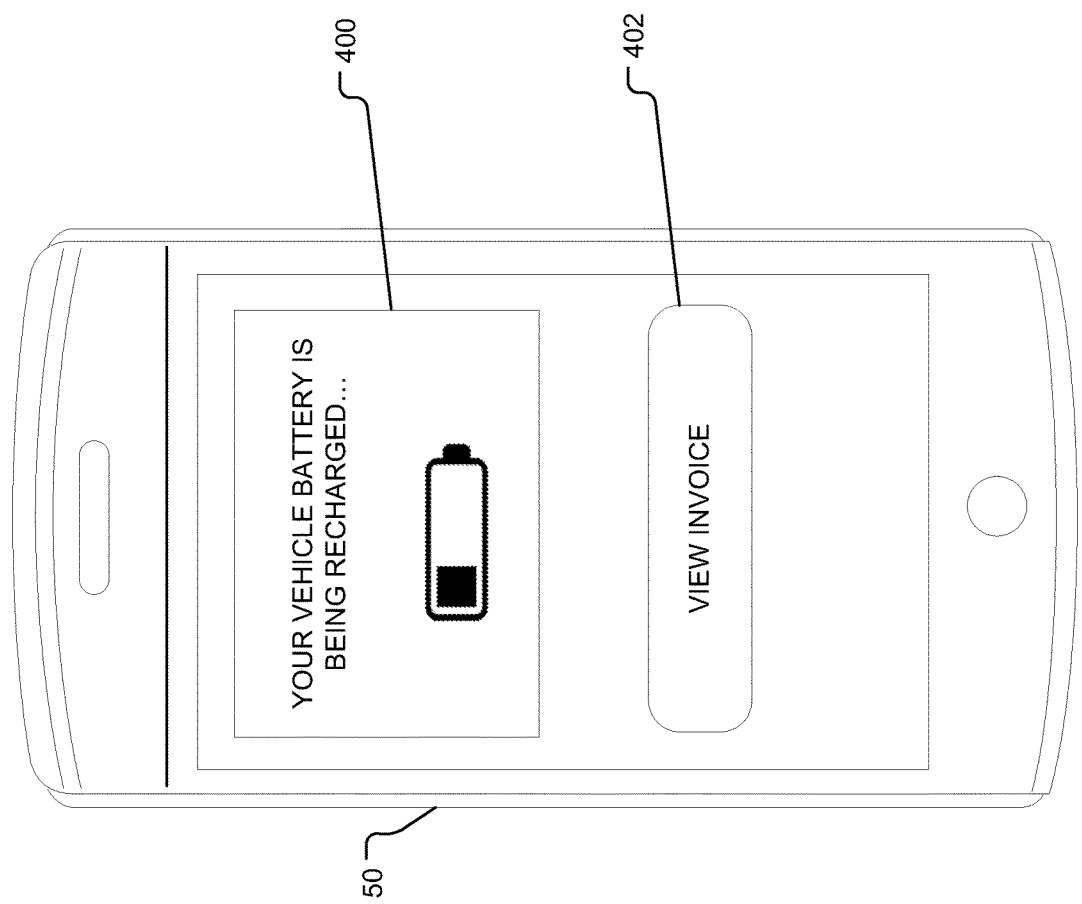
FIG. 40 depicts a mobile device displaying a battery recharging notification and a user interface element to view of an invoice for the battery recharging.

In one embodiment, as depicted in FIG. 40, a mobile device 50 displays a battery recharging notification 400 and a user interface element 402 to view of an invoice for the battery recharging by a vehicle-recharging unit (VRU). Optionally, the mobile device 50 may query the user to accept the proposed price from the VRU. Optionally, the mobile device may obtain quotes from more than one VRU to obtain the best price and/or the quickest service.

Figure 41:
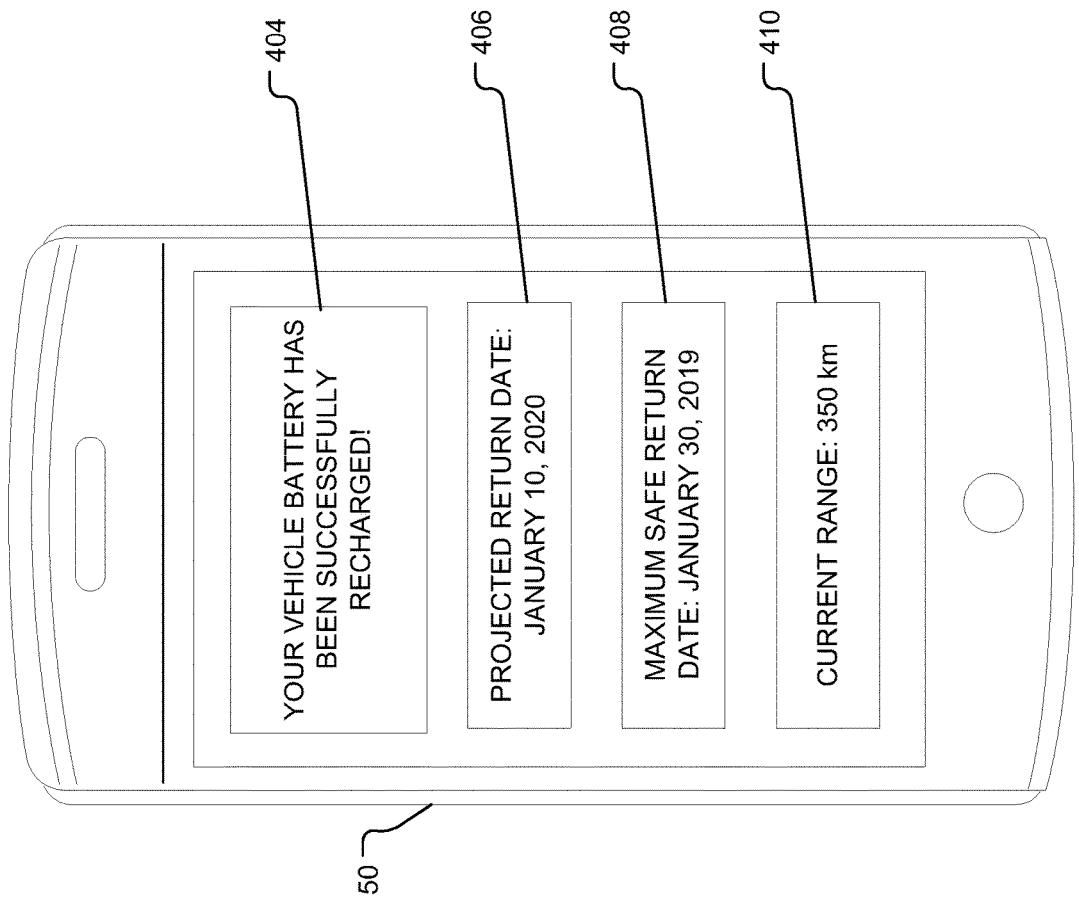
FIG. 41 depicts a mobile device displaying a recharge-completion notification, the projected return date, the maximum safe return date and the current range of the recharged vehicle.

After the battery has been recharged, the mobile device may receive a notification that the battery is now fully recharged. FIG. 41 depicts the mobile device 50 displaying a recharge-completion notification 404, the projected return date 406, the maximum safe return date 408 and the current range 410 of the recharged vehicle.

Figure 42:
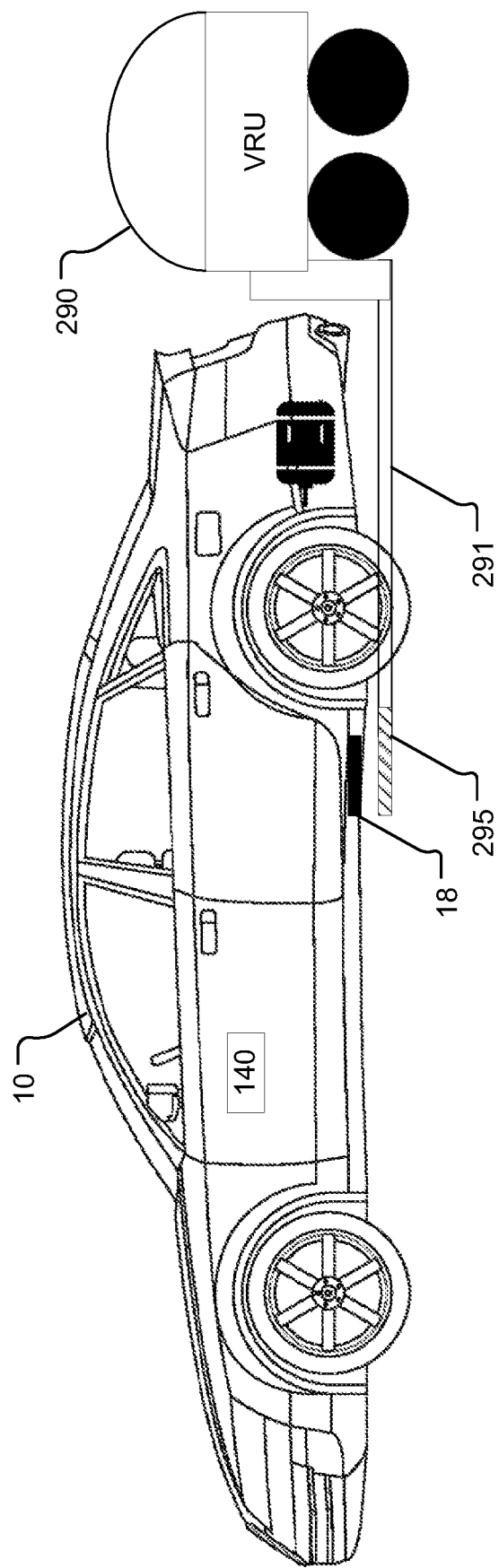
FIG. 42 depicts a vehicle being inductively recharged by an inductive charging element of a vehicle-recharging unit (VRU).

FIG. 42 depicts a vehicle 10 whose battery 18 is being inductively recharged by a vehicle-recharging unit (VRU) 290. The VRU in this example includes an arm, e.g. a robotic arm 291 and an inductive charging element 295 (e.g. an inductive charging coil) attached or mounted to a distal end of the robotic arm 291. The inductive charging element 295 is positioned in close proximity to the battery 18 to induc-tively charge the battery 18.

Figure 43:
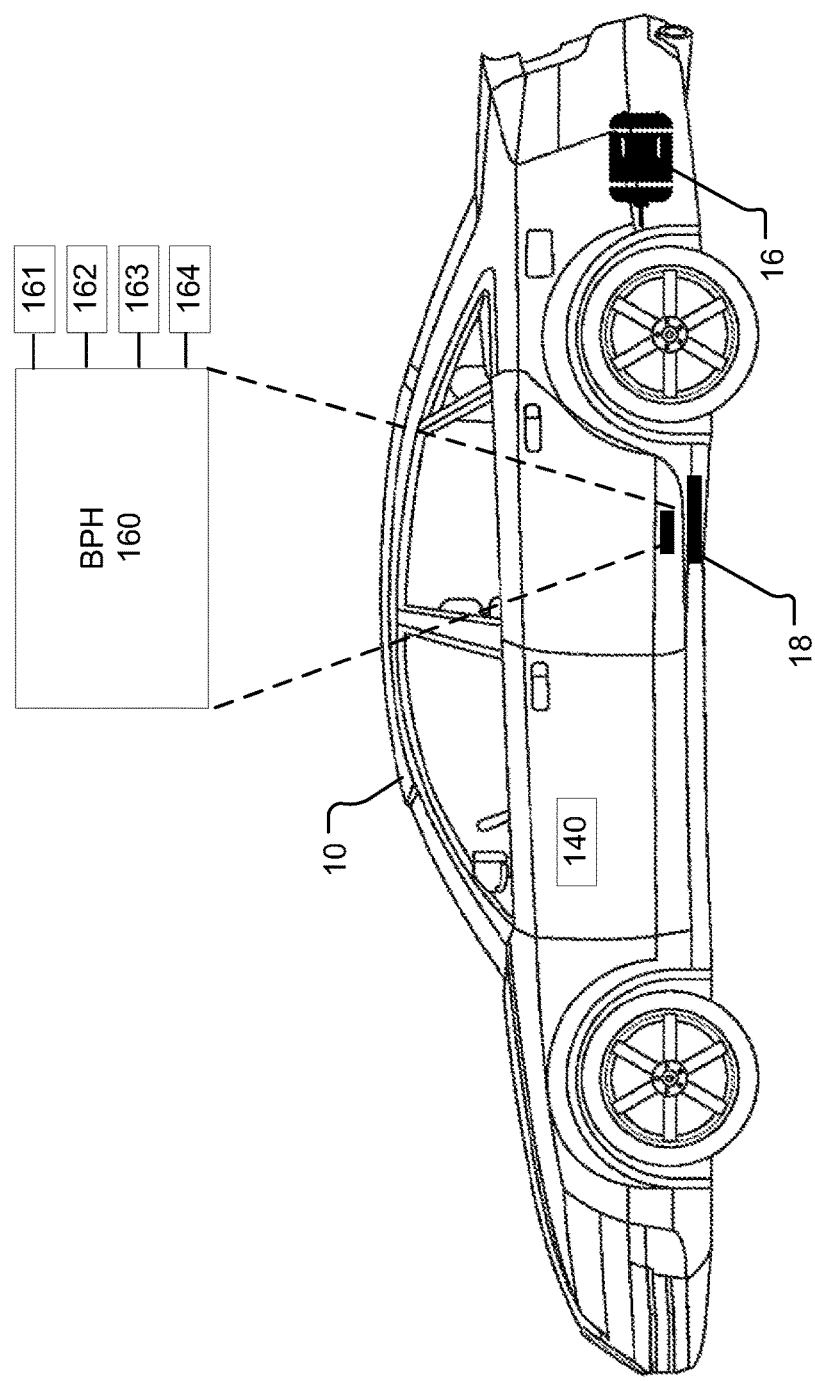
FIG. 43 depicts a vehicle with a battery pre-heater.

In one implementation, as depicted in FIG. 43, the vehicle 10 includes a battery pre-heater 160 to pre-heat the battery 18 if the temperature is below a predetermined level. Pre-heating is particularly helpful for lithium-ion batteries which are degraded by very low temperature. In one embodiment depicted by way of example in FIG. 43, the battery pre-heater (BPH) 160 pre-heats the battery prior to charging. In another embodiment, the BPH 160 pre-heats the battery prior to discharging. In yet another embodiment, the BPH 160 pre-heats the battery prior to charging and also prior to discharging. The BPH 160 may include a heating element 161, a heat controller 162 for controlling the heating element 161 and a battery temperature sensor 163 communicatively connected to the heat controller 162 to sense a battery temperature and to provide a feedback signal to the heat controller 162. The BPH 160 may include its own BPH battery 164 to provide power to pre-heat the battery 18. In one implementation, the BPSM 140 may send a signal to the BPH 160 to pre-heat the battery 18. In another implemen-tation, the BPH 160 makes its own independent determina-tion as to whether it should pre-heat the battery 18. If the temperature is below a threshold, the BPH 160 may pre-heat the battery 18 a predetermined time before the user is scheduled to return to the vehicle so that the battery is warmed to a desired operating temperature when the vehicle is started. The BPH may also pre-heat the battery 18 a predetermined time before the VRU is scheduled to com-mence re-charging of the battery 18 (again if the temperature is below a predetermined threshold). The pre-heating of the battery 18 prior to re-charging or discharging helps to preserve the lifespan and performance characteristics of the battery. In another implementation, the battery is pre-heated to reach a prescribed temperature such as for example 32° F., 40° F., 50° F., 60° F., or any other prescribed temperature level that provides desired operating characteristics.

Figure 44:
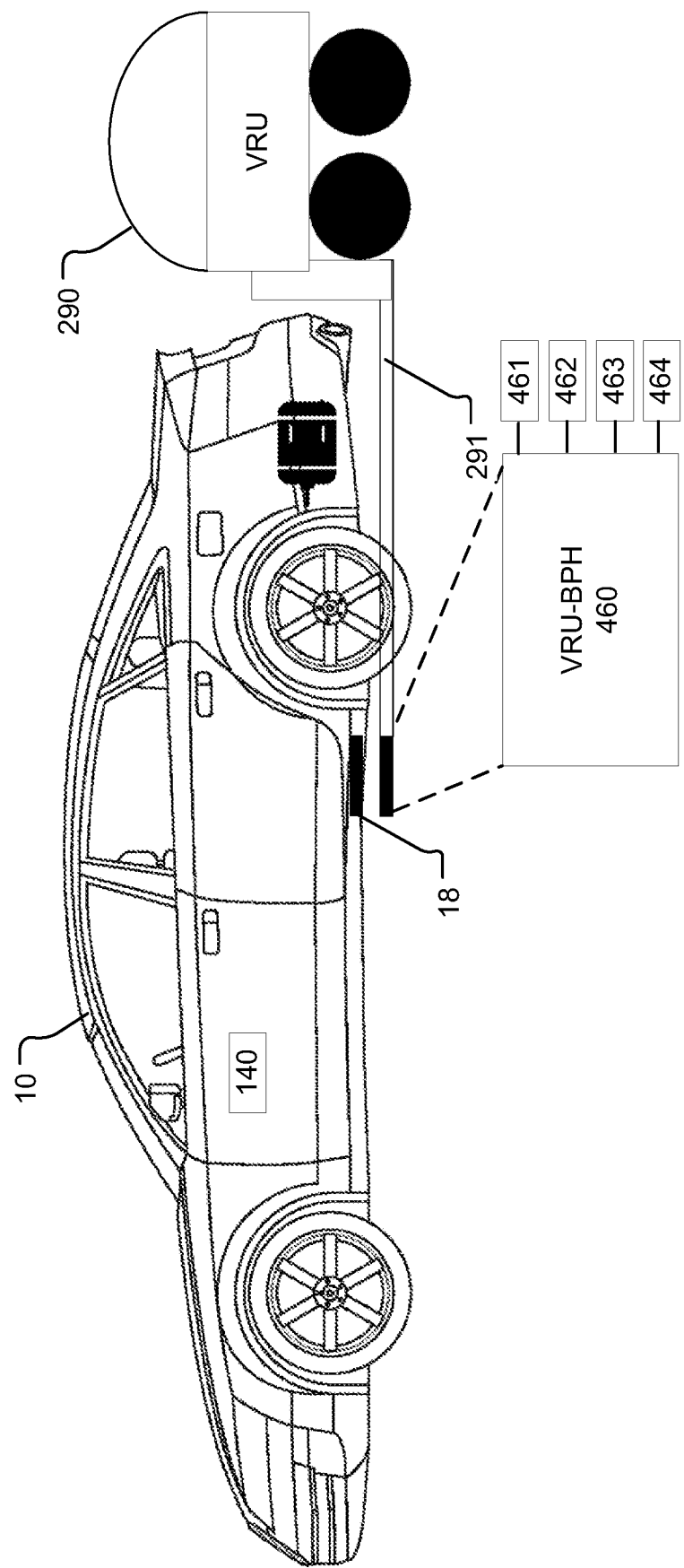
FIG. 44 depicts a vehicle whose battery is being pre-heated by a battery pre-heater of a VRU prior to recharging the battery.

In the implementation depicted in FIG. 44, an external BPH 460 (i.e. a battery pre-heater that is external to the vehicle) is used to pre-heat the battery 18 of the vehicle, e.g. by convection and/or radiant heat transfer. In this example implementation, the external BPH 460 is part of the VRU 290. The VRU 290 uses the elongated arm, e.g. the robotic arm 291, to extend and position the BPH 460 beneath the battery 18 in close proximity to the battery 18 to pre-heat the battery 18.

Figure 45:
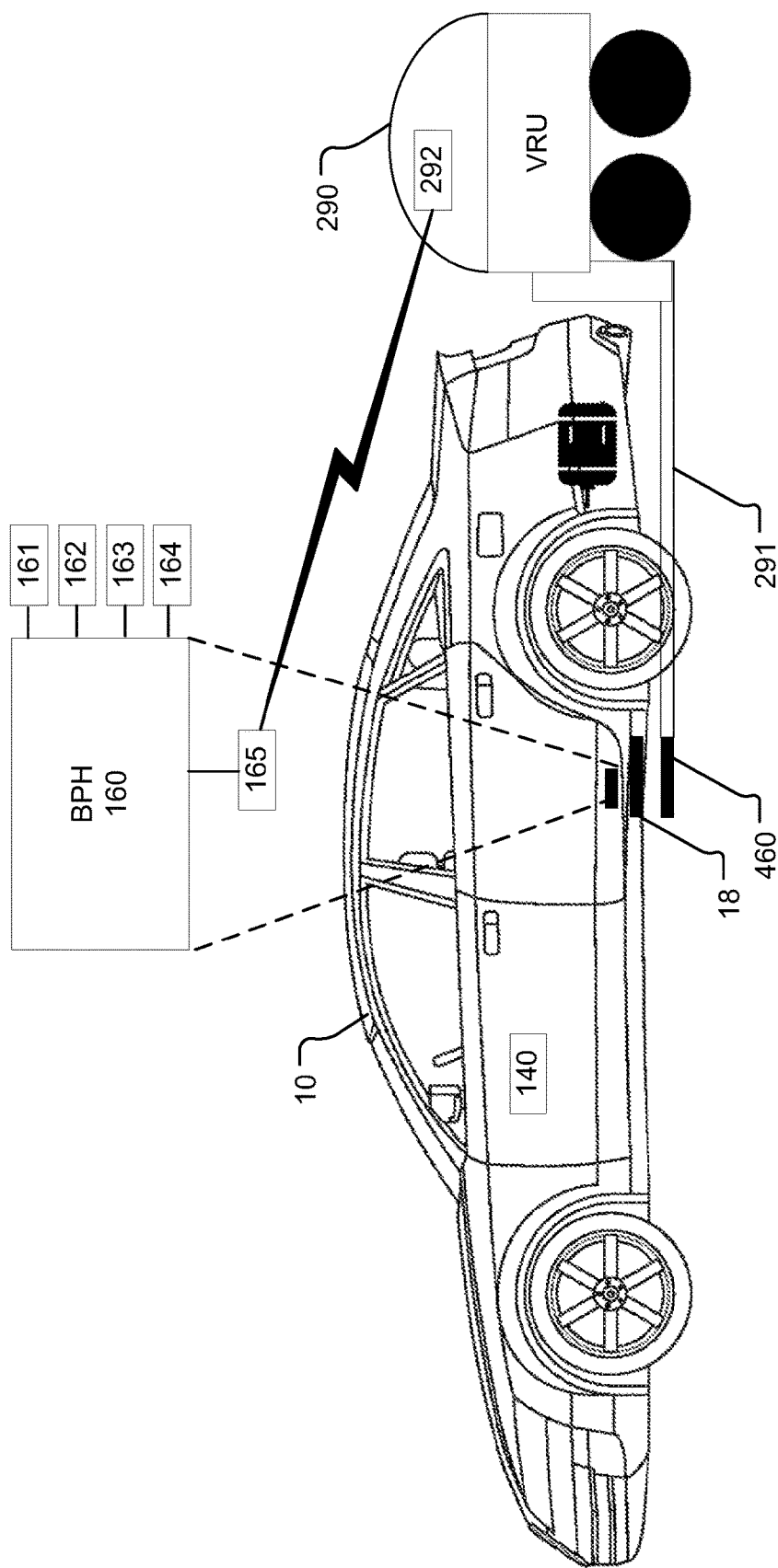
FIG. 45 depicts a vehicle having an onboard battery pre-heater but signaling a VRU to use its own battery pre-heater to pre-heat the battery of the vehicle.

In the implementation depicted in FIG. 45, the BPH 160 in the vehicle 10 has a communication circuit or transmitter 165 to send a signal to a receiver 291 of the VRU 290 to request that the VRU 290 pre-heat the battery 18 using the external BPH 460 mounted to the distal end of the robotic arm 291. The VRU 290 may thus use its own battery pre-heater, i.e. VRU-BPH 460, to pre-heat the battery 18 of the vehicle 10 for situations when the BPH battery 164 itself is depleted by the prolonged exposure to the cold tempera-tures or if the BPH 160 lacks its own battery.

Figure 46:
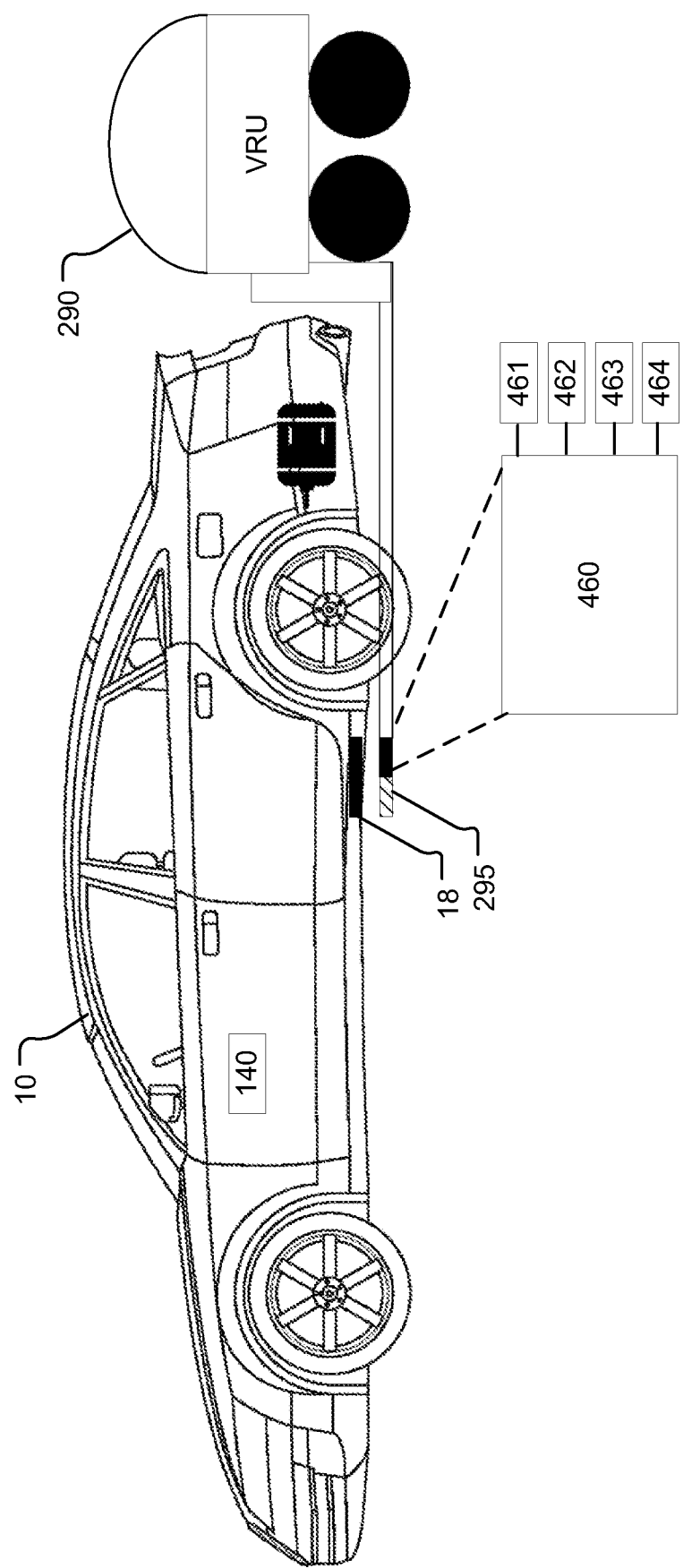
FIG. 46 depicts a VRU pre-heating and recharging a battery of a vehicle.

In the implementation depicted in FIG. 46, the robotic arm 291 of the VRU 290 may have both a BPH 460 and an inductive charging element 295. The VRU positions the BPH 460 and inductive charging element 295 beneath the vehicle is close proximity to the battery 18 to pre-heat the battery 18 and then recharge the battery. In one embodiment, the robotic arm first positions the BPH 460 in immediate proximity with the battery 18 and then repositions the inductive charging element 295 to be immediately proxi-mate to the battery 18 after pre-heating is complete. In one embodiment, the pre-heating and recharging are done sequentially. In another embodiment, the recharging is ini-tiated before the pre-heating is complete. In yet another embodiment, the recharging and pre-heating are simultane-ous.

Although these figures depict an inductive charging ele-ment (e.g. inductive coil), the vehicle-recharging unit (VRU) 290 in another embodiment may include an electri-cally conductive recharger having a wired conductive con-nection to a vehicle charging port, e.g. a robotically guided plug that is automatically connected to the vehicle charging port to recharge the vehicle.

Another aspect is a method performed by an autonomous electric vehicle of predicting battery status of a battery after exposure to cold weather. The method entails determining a destination of the vehicle. The destination may be determined by obtaining the destination from a navigation system configured for navigating the autonomous electric vehicle. The method may entail using a mobile device data interface connected to a mobile device of a user using the autonomous electric vehicle to receive event data from the mobile device relating to the destination. The event data may be extracted from one of a calendar event, an electronic reservation or an electronic ticket. The method may entail predicting, based on the event data received from the mobile device, whether the vehicle will be parked at the destination. This predicting step may be done by executing a battery status prediction module by a processor of the vehicle. If the battery status prediction module predicts that the vehicle will be parked at the destination, the method entails using the battery status prediction module to predict, based on the event data received from the mobile device, a time period when the vehicle will be parked at the destination. The method then entails using the battery status prediction module to predict a predicted battery status at the end of the time period based on a temperature profile for the time period. The temperature profile may be obtained from a remote weather server for the time period when the vehicle will be parked. The method then entails using the battery status prediction module to determine if the predicted battery status at the end of the time period will have at least a minimum battery capacity to travel a distance to a charging station. The distance to the charging station is determined by the battery status prediction module from the destination and a location of the charging station. If the predicted battery status is below the minimum battery capacity, the method then entails using the battery status prediction module to output an alert to the user that the predicted battery capacity at the end of the time period is insufficient to travel the distance to the charging station.

The method may comprise a further step or operation of obtaining historical traffic data for a route from the destination to the charging station for the day and time corresponding to the end of the time period when the user is predicted to return to the vehicle.

The method may comprise a further step, act or operation of requesting a vehicle recharging unit to recharge the battery. In general, this involves summoning the vehicle recharging unit to location of the user's electric vehicle.

The method may comprise a further step, act or operation of sending a battery-recharge notification to the mobile device of the user to indicate that the vehicle recharging unit has recharged the battery.

The method may comprise a further step, act or operation of receiving a travel-change message from the mobile device of the user indicating that the user will return after an extended time period. The battery status prediction module recalculates the predicted battery status corresponding to the extended time period and sends a reply via the radiofrequency transceiver to the mobile device of the user whether the predicted battery status based on the extended time period will have sufficient capacity to travel to the charging station.

The method may comprise a further step, act or operation of downloading weather updates during the time period to revise the predicted battery status.

The method may comprise a further step, act or operation of determining if the predicted battery status has changed by more than a predetermined amount and, if the predicted battery status has changed by more than the predetermined amount, sending an update to the mobile device of the user.

The method may comprise a further step, act or operation of outputting a vehicle-departure message to the user that the vehicle has departed the destination to travel to the charging station due to an insufficient predicted battery status.

The method may comprise a further step, act or operation of outputting a vehicle-departure permission request message to the user asking the user to confirm that the vehicle may depart the destination to travel to the charging station due to an insufficient predicted battery status.

The method may comprise a further step, act or operation of determining a warmer parking place nearby the destination and sending a relocation request to the user to permit relocation of the vehicle to the warmer parking place.

These methods can be implemented in hardware, software, firmware or as any suitable combination thereof. That is, if implemented as software, the computer-readable medium comprises instructions in code which when loaded into memory and executed on a processor of a tablet or mobile device causes the tablet or mobile device to perform any of the foregoing method steps. These method steps may be implemented as software, i.e. as coded instructions stored on a computer readable medium which performs the foregoing steps when the computer readable medium is loaded into memory and executed by the microprocessor of the mobile device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. An autonomous electric vehicle comprising:
a chassis;
wheels rotationally mounted to the chassis;
an electric motor mechanically connected to one or more of the wheels for driving the one or more of the wheels;

a battery electrically connected to the electric motor for powering the electric motor;

a navigation system for autonomously navigating the autonomous electric vehicle to a destination;

a mobile device data interface connected to a mobile device of a user using the autonomous electric vehicle, wherein the mobile device data interface receives event data from the mobile device relating to the destination, wherein the event data is extracted from one of a calendar event, an electronic hotel reservation, an electronic ticket or an out-of-office e-mail message;

a battery status prediction module executed by a processor to predict, based on the event data received from the mobile device, whether the vehicle will be parked at the destination and, if the battery status prediction module predicts that the vehicle will be parked at the destination, the battery status prediction module predicts, based on the event data received from the mobile device, a time period when the vehicle will be parked at the destination, wherein the battery status prediction module predicts a predicted battery status at the end of the time period based on a temperature profile for the time period while the vehicle is parked and based on a total number of discharge cycles for the battery;

a radiofrequency transceiver communicatively connected to the battery monitoring system to obtain the temperature profile from a remote weather server for the time period when the vehicle will be parked, wherein the battery status prediction module determines if the predicted battery status at the end of the time period will have at least a minimum battery capacity to travel a distance to a charging station, wherein the distance is determined by the battery status prediction module based on the destination where the vehicle will be parked and a location of the charging station; and wherein the battery status prediction module, if the predicted battery status is below the minimum battery capacity, outputs an alert to the user that the predicted battery capacity at the end of the time period is insufficient to travel the distance to the charging station.

2. The autonomous electric vehicle of claim 1 wherein the battery status prediction module cooperates with the radiofrequency transceiver to obtain historical traffic data for a route from the destination to the charging station for the day and time corresponding to the end of the time period when the user is predicted to return to the vehicle.

3. The autonomous electric vehicle of claim 1 wherein the battery status prediction module cooperates with the radiofrequency transceiver to request a vehicle recharging unit to recharge the battery, wherein the vehicle recharging unit comprises a battery pre-heater to pre-heat the battery prior to recharging the battery.

4. The autonomous electric vehicle of claim 3 wherein the battery status prediction module cooperates with the radiofrequency transceiver to send a proposed price for recharging the battery to the mobile device of the user and then to send a battery-recharge notification to the mobile device of the user to indicate that the vehicle recharging unit has recharged the battery and to also send an invoice for recharging the battery to the mobile device of the user.

5. The autonomous electric vehicle of claim 1 wherein the battery status prediction module outputs a vehicle-departure message to the user that the vehicle has departed the destination to travel to the charging station due to an insufficient predicted battery status, wherein the autonomous electric vehicle employs a user-predetermined geofence within which the autonomous electric vehicle is authorized to travel without requesting user permission.

6. The autonomous electric vehicle of claim 1 wherein the battery is a first battery of a first chemical type and wherein the autonomous electric vehicle further comprises a second battery of a second chemical type, wherein the battery status prediction module causes a portion of an electric charge in the first battery to be conducted to the second battery in response to a determination that the autonomous electric vehicle will be parked for a time longer than a time threshold at a temperature lower than a low temperature threshold.

7. The autonomous electric vehicle of claim 1 comprising an ultracapacitor and wherein the battery status prediction module causes a portion of an electric charge in the battery to be conducted to the ultracapacitor in response to a determination that the autonomous electric vehicle will be parked for a time longer than a time threshold at a temperature lower than a low temperature threshold.

8. An electric vehicle comprising:

a chassis;

wheels rotationally mounted to the chassis;

an electric motor mechanically connected to one or more of the wheels for driving the one or more of the wheels;

a battery electrically connected to the electric motor for powering the electric motor;

a parked-status prediction module for predicting from historical usage patterns a destination where the vehicle will be parked;

a mobile device data interface connected to a mobile device of a user using the electric vehicle, wherein the mobile device data interface receives event data from the mobile device relating to the destination, wherein the event data is extracted from one of a calendar event, an electronic hotel reservation, an electronic ticket or an out-of-office e-mail message;

a battery status prediction module executed by a processor to predict, based on the event data received from the mobile device, whether the vehicle will be parked at the destination and, if the battery status prediction module predicts that the vehicle will be parked at the destination, the battery status prediction module predicts, based on the event data received from the mobile device, a time period when the vehicle will be parked at the destination, wherein the battery status prediction module predicts a predicted battery status at the end of the time period based on a temperature profile for the time period while the vehicle is parked and based on a total number of discharge cycles for the battery;

a radiofrequency transceiver communicatively connected to the battery monitoring system to obtain the temperature profile from a remote weather server for the time period when the vehicle will be parked, wherein the battery status prediction module determines if the predicted battery status at the end of the time period will have at least a minimum battery capacity to travel a distance to a charging station, wherein the distance is determined by the battery status prediction module based on the destination where the vehicle will be parked and a location of the charging station; and wherein the battery status prediction module, if the predicted battery status is below the minimum battery capacity, outputs an alert to the user that the predicted battery capacity at the end of the time period is insufficient to travel the distance to the charging station.

9. The electric vehicle of claim 8 wherein the battery status prediction module cooperates with the radiofrequency transceiver to obtain historical traffic data for a route from the destination to the charging station for the day and time corresponding to the end of the time period when the user is predicted to return to the vehicle.

10. The electric vehicle of claim 8 wherein the battery status prediction module cooperates with the radiofrequency transceiver to request a vehicle recharging unit to recharge the battery, wherein the vehicle recharging unit comprises a battery pre-heater to pre-heat the battery prior to recharging the battery.

11. The electric vehicle of claim 10 wherein the battery status prediction module cooperates with the radiofrequency transceiver to send a proposed price for recharging the battery to the mobile device of the user and then to send a battery-recharge notification to the mobile device of the user to indicate that the vehicle recharging unit has recharged the battery and to also send an invoice for recharging the battery to the mobile device of the user.

12. The electric vehicle of claim 8 wherein the battery status prediction module outputs a vehicle-departure message to the user that the vehicle has departed the destination in an autonomous driving mode to travel to the charging station due to an insufficient predicted battery status, wherein the autonomous electric vehicle employs a user-predetermined geofence within which the autonomous electric vehicle is authorized to travel without requesting user permission.

13. The electric vehicle of claim 8 wherein status the battery is a first battery of a first chemical type and wherein the autonomous electric vehicle further comprises a second battery of a second chemical type, wherein the battery status prediction module causes a portion of an electric charge in the first battery to be conducted to the second battery in response to a determination that the autonomous electric vehicle will be parked for a time longer than a time threshold at a temperature lower than a low temperature threshold.

14. The electric vehicle of claim 8 comprising an ultracapacitor and wherein the battery status prediction module causes a portion of an electric charge in the battery to be conducted to the ultracapacitor in response to a determination that the autonomous electric vehicle will be parked for a time longer than a time threshold at a temperature lower than a low temperature threshold.

15. An autonomous electric vehicle comprising:
a chassis;
wheels rotationally mounted to the chassis;
an electric motor mechanically connected to one or more of the wheels for driving the one or more of the wheels;
a battery electrically connected to the electric motor for powering the electric motor;
a navigation system for autonomously navigating the autonomous electric vehicle to a destination;
a mobile device data interface connected to a mobile device of a user using the autonomous electric vehicle, wherein the mobile device data interface receives event data from the mobile device relating to the destination, wherein the event data is extracted from one of a social media post, an SMS message, an e-mail message or an out-of-office e-mail message;
a battery status prediction module executed by a processor to predict, based on the event data received from the mobile device, whether the vehicle will be parked at the destination and, if the battery status prediction module predicts that the vehicle will be parked at the destination, the battery status prediction module predicts, based on the event data received from the mobile device, a time period when the vehicle will be parked at the destination, wherein the battery status prediction module predicts a predicted battery status at the end of the time period based on a temperature profile for the time period;
a radiofrequency transceiver communicatively connected to the battery monitoring system to obtain the temperature profile from a remote weather server for the time period when the vehicle will be parked,
wherein the battery status prediction module determines if the predicted battery status at the end of the time period will have at least a minimum battery capacity to travel a distance to a charging station, wherein the distance is determined by the battery status prediction module based on the destination where the vehicle will be parked and a location of the charging station; and
wherein the battery status prediction module, if the predicted battery status is below the minimum battery capacity, outputs an alert to the user that the predicted battery capacity at the end of the time period is insufficient to travel the distance to the charging station.

16. The autonomous electric vehicle of claim 15 wherein the battery status prediction module cooperates with the radiofrequency transceiver to request a vehicle recharging unit to recharge the battery, wherein the vehicle recharging unit comprises a battery pre-heater to pre-heat the battery prior to recharging the battery.

17. The autonomous electric vehicle of claim 15 wherein the battery is a first battery of a first chemical type and wherein the autonomous electric vehicle further comprises a second battery of a second chemical type, wherein the battery status prediction module causes a portion of an electric charge in the first battery to be conducted to the second battery in response to a determination that the autonomous electric vehicle will be parked for a time longer than a time threshold at a temperature lower than a low temperature threshold.

18. The autonomous electric vehicle of claim 15 wherein the comprising an ultracapacitor and wherein the battery status prediction module causes a portion of an electric charge in the battery to be conducted to the ultracapacitor in response to a determination that the autonomous electric vehicle will be parked for a time longer than a time threshold at a temperature lower than a low temperature threshold.

* * * * *